(12) United States Patent
Shimura et al.

(10) Patent No.: US 8,077,282 B2
(45) Date of Patent: *Dec. 13, 2011

(54) LIQUID CRYSTAL DISPLAY DEVICE

(75) Inventors: Masato Shimura, Mobara (JP); Tohru Sasaki, Mobara (JP); Toshiki Asakura, Togane (JP); Makiko Imabayashi, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/926,561

(22) Filed: Nov. 24, 2010

(65) Prior Publication Data

US 2011/0069270 A1    Mar. 24, 2011

Related U.S. Application Data

(63) Continuation of application No. 11/727,859, filed on Mar. 28, 2007, now Pat. No. 7,864,282.

(30) Foreign Application Priority Data

Apr. 12, 2006 (JP) ................................. 2006-109990

(51) Int. Cl.
   *G02F 1/1343* (2006.01)
(52) U.S. Cl. ...................................................... 349/141
(58) Field of Classification Search ........................ None
    See application file for complete search history.

(56) References Cited

U.S. PATENT DOCUMENTS

| | | | |
|---|---|---|---|
| 6,233,034 B1 | 5/2001 | Lee et al. | |
| 6,411,357 B1 | 6/2002 | Ting et al. | |
| 6,611,310 B2 | 8/2003 | Kurahashi et al. | |
| 6,630,979 B2 | 10/2003 | Yang | |
| 6,667,790 B2 | 12/2003 | Yanagawa et al. | |
| 6,704,085 B2 | 3/2004 | Nishimura et al. | |
| 6,741,310 B1 | 5/2004 | Nakanishi et al. | |
| 6,784,964 B2 | 8/2004 | Nakayoshi et al. | |
| 6,903,793 B2 | 6/2005 | Kaneko et al. | |
| 7,289,181 B2 | 10/2007 | Kaneko et al. | |
| 7,345,729 B2 | 3/2008 | Ohta et al. | |
| 7,864,282 B2 * | 1/2011 | Shimura et al. ............... 349/141 |
| 2002/0033922 A1 | 3/2002 | Hidehira et al. | |
| 2004/0057005 A1 | 3/2004 | Matsumoto et al. | |
| 2005/0237465 A1 * | 10/2005 | Lu et al. ......................... 349/141 |
| 2006/0050220 A1 | 3/2006 | Matsumoto et al. | |
| 2006/0061723 A1 | 3/2006 | Mori et al. | |

* cited by examiner

*Primary Examiner* — David Nelms
*Assistant Examiner* — Thanh-Nhan Nguyen
(74) *Attorney, Agent, or Firm* — Stites & Harbison PLLC; Juan Carlos A. Marquez, Esq.

(57) ABSTRACT

A liquid crystal display device that includes: a liquid crystal display panel configured by a pair of substrates sandwiching therebetween a liquid crystal material with a positive dielectric anisotropy; and a flat-shaped common electrode and a pixel electrode disposed on one of the pair of substrates with an overlay, via an insulator layer, between the common electrode and the pixel electrode when viewed from above. In the liquid crystal display device, the pixel electrode is extended in a first direction, and includes a plurality of comb-like electrode sections aligned in a second direction orthogonal to the first direction, and the comb-like electrode sections of the pixel electrode are varied in width in the second direction for a plurality of times at intervals shorter than a side extending in the first direction.

8 Claims, 22 Drawing Sheets

LIQUID CRYSTAL DISPLAY DEVICE

CROSS REFERENCE TO RELATED APPLICATIONS

This application is a Continuation of nonprovisional U.S. application Ser. No. 11/727,859 filed on Mar. 28, 2007 now U.S. Pat. No. 7,864,282. Priority is claimed based on U.S. application Ser. No. 11/727,859 filed on Mar. 28, 2007, which claims the priority of Japanese Application 2006-109990 filed on Apr. 12, 2006, the contents of which are hereby incorporated by reference into this application.

BACKGROUND OF THE INVENTION

The present invention relates to a liquid crystal display device and, more specifically, to a technology that works well with a liquid crystal display device in which a substrate sandwiching a liquid crystal material with another substrate carries thereon a common electrode and a pixel electrode, and the pixel electrode is disposed above the common electrode via an insulator layer, and includes a comb-like electrode section.

The liquid crystal display device falls into two broad categories of VA (Vertical Alignment) and IPS (In-plane Switching) in view of the direction of an electric field for application to a liquid crystal material, i.e., liquid crystal layer.

In a VA-mode liquid crystal display device, on a substrate sandwiching a liquid crystal material with another substrate, a pixel electrode is disposed, and on the other substrate, a common electrode is so disposed as to oppose the pixel electrode. The common electrode is referred to also as opposing electrode. The VA-mode liquid crystal display is typified also by a TN (Twisted Nematic) mode.

In an IPS-mode liquid crystal display device, on the other hand, on a substrate sandwiching a liquid crystal material with another substrate, a pixel electrode and a common electrode are both disposed. Compared with the VA-mode liquid crystal display device, the IPS-mode liquid crystal display device can easily have a wider viewing angle, and thus has become popular for use in liquid crystal televisions.

In the IPS-mode liquid crystal display device, one substrate carries thereon both a pixel electrode and a common electrode. For the IPS-mode liquid crystal display device, there thus has been proposed various electrode layouts and shapes to achieve efficient application of an electric field to a liquid crystal layer. The electric field is the one to be generated by a potential difference between the pixel and common electrodes.

As one possible layout of the pixel and common electrodes in the IPS-mode liquid crystal display device, the pixel electrode is disposed on the common electrode with an insulator layer therebetween. With such a layout, for example, the common electrode is shaped flat, and the pixel electrode is shaped like a comb. As an example, refer to Patent Document 1 (U.S. Pat. No. 6,233,034).

In an exemplary liquid crystal display device in which a substrate carries thereon a flat-shaped common electrode with a comb-like pixel electrode thereabove with an insulator layer disposed therebetween, a liquid crystal layer is made of a material with a positive dielectric anisotropy, for example.

SUMMARY OF THE INVENTION

The issue here is that an IPS-mode liquid crystal display device has a problem of longer response time compared with a VA-mode liquid crystal display device. This, problematically, reduces the performance of moving image display for use for a liquid crystal television or others.

For the aim of reducing the response time, a previous IPS-mode liquid crystal display device adopts the method of reducing the viscosity of a liquid crystal material for use for a liquid crystal layer, or the method of narrowing a cell gap by reducing the thickness of a liquid crystal layer.

However, such a method of reducing the viscosity of a liquid crystal material or narrowing a cell gap has limitations, and has a difficulty in increasing the performance of moving image display to a further degree.

An IPS-mode liquid crystal display device also has a problem of, if a display change is made from high transmittance, e.g., white display, to low transmittance, e.g., black display, taking a longer time for the transmittance to fall and reach a predetermined value compared with a VA-mode liquid crystal display device.

That is, the response characteristics of the previous IPS-mode liquid crystal display device are lower than those of the VA-mode liquid crystal display device.

An object of the invention is to provide a technology that enables an IPS-mode liquid crystal display device to have higher response characteristics.

That and other objects, and any new features of the present invention will become more apparent from the following detailed description of the invention when taken in conjunction with the accompanying drawings.

The invention has the typical features and aspects as below.

A first aspect of the invention is directed to a liquid crystal display device, including: a liquid crystal display panel configured by a pair of substrates sandwiching therebetween a liquid crystal material with a positive dielectric anisotropy; and a flat-shaped common electrode and a pixel electrode disposed on one of the pair of substrates with an overlay, via an insulator layer, between the common electrode and the pixel electrode when viewed from above. In the liquid crystal display device, the pixel electrode is extended in a first direction, and includes a plurality of comb-like electrode sections aligned in a second direction orthogonal to the first direction, and the comb-like electrode sections of the pixel electrode are varied in width in the second direction for a plurality of times at intervals shorter than a side extending in the first direction.

According to a second aspect, in the first aspect, the comb-like electrode sections each have a plurality of protruding portions or recessed portions, in the second direction, in the side or another extending in the first direction.

According to a third aspect, in the first aspect, the comb-like electrode sections each have a plurality of protruding portions, in the second direction, in the side or another extending in the first direction, and in two of the adjacent comb-like electrode sections, the protruding portions in the two sides opposing each other via a slit formed between the two of the adjacent comb-like electrode sections are aligned when viewed from the first direction.

According to a fourth aspect, in the first aspect, the comb-like electrode sections each have a plurality of protruding portions, in the second direction, in the side and another extending in the first direction, and in two of the adjacent comb-like electrode sections, the protruding portions in the two sides opposing each other via a slit formed between the two of the adjacent comb-like electrode sections are slightly misaligned when viewed from the first direction by an amount smaller than an interval between the protruding portions in one of the sides.

According to a fifth aspect, in the first aspect, the comb-like electrode sections each have a plurality of recessed portions, in the second direction, in the side or another extending in the first direction, and in two of the adjacent comb-like electrode sections, the recessed portions in the two sides opposing each other via a slit formed between the two of the adjacent comb-like electrode sections are aligned when viewed from the first direction.

According to a sixth aspect, in the first aspect, the comb-like electrode sections each have a plurality of recessed portions, in the second direction, in the side or another extending in the first direction, and in two of the adjacent comb-like electrode sections, the recessed portions in the two sides opposing each other via a slit formed between the two of the adjacent comb-like electrode sections are slightly misaligned when viewed from the first direction by an amount smaller than an interval between the recessed portions in one of the sides.

According to a seventh aspect, in the first aspect, the comb-like electrode sections each have a protruding portion and a recessed section alternately, in the second direction, in the side or another extending in the first direction.

According to an eighth aspect, in the seventh aspect, in two of the adjacent comb-like electrode sections, the protruding portions and the recessed portions in the two sides opposing each other via a slit formed between the two of the adjacent comb-like electrode sections are respectively aligned when viewed from the first direction.

According to a ninth aspect, in the seventh aspect, in two of the adjacent comb-like electrode sections, the protruding portions and the recessed portions in the two sides opposing each other via a slit formed between the two of the adjacent comb-like electrode sections are alternately aligned when viewed from the first direction.

A tenth aspect of the invention is directed to a liquid crystal display device, including: a liquid crystal display panel configured by a pair of substrates sandwiching therebetween a liquid crystal material with a positive dielectric anisotropy; and a flat-shaped common electrode and a pixel electrode disposed on one of the pair of substrates with an overlay, via an insulator layer, between the common electrode and the pixel electrode when viewed from above. In the liquid crystal display device, the pixel electrode is extended in a first direction, and includes a plurality of comb-like electrode sections aligned in a second direction orthogonal to the first direction, and the comb-like electrode sections of the pixel electrode are changed in position, when viewed from the second direction, for a plurality of times at intervals shorter than a side extending in the first direction, and at distances shorter than a width along the second direction.

According to an eleventh aspect, in the tenth aspect, the comb-like electrode sections each have a plurality of protruding portions, in the second direction, in the side or another extending in the first direction, and a plurality of recessed portions, in the second direction, in a remaining of the two sides, and in one of the comb-like electrode sections, the protruding portions and the recessed portions in the two sides extending in the first direction are aligned when viewed from the first direction.

According to a twelfth aspect, in the eleventh aspect, in two of the adjacent comb-like electrode sections, one of the two sides opposing each other via a slit formed between the two of the adjacent comb-like electrode sections has a plurality of protruding portions in the second direction, and a remaining of the two sides has a plurality of recessed portions in the second direction.

According to a thirteenth aspect, in the eleventh aspect, in two of the adjacent comb-like electrode sections, the two sides opposing each other via a slit formed between the two of the adjacent comb-like electrode sections each have a plurality of protruding portions in the second direction, or a plurality of recessed portions in the second direction.

The liquid crystal display device of the invention is of IPS mode, as a prerequisite, including a flat-shaped common electrode and a pixel electrode disposed, with an overlay, on one of a pair of substrates sandwiching therebetween a liquid crystal material, via an insulator layer, between the common electrode and the pixel electrode when viewed from above. The pixel electrode is extended in a first direction, and includes a plurality of comb-like electrode sections aligned in a second direction orthogonal to the first direction. In such a liquid crystal display device of the invention, for example, the comb-like electrode sections of the pixel electrode are varied in width in the second direction for a plurality of times at intervals shorter than a side extending in the first direction. In this configuration, when an electric field is generated due to a potential difference between the pixel and common electrodes, a splay or bend deformation is observed in the orientation of liquid crystal molecules in the comb-like electrode sections at portions where the width is changed along the second direction.

In the IPS-mode liquid crystal display device, when an electric field is generated, a twist deformation is generally observed in the orientation of liquid crystal molecules so that the liquid crystal material, i.e., liquid crystal layer, shows an orientation change. It is known that the length of the response time of a liquid crystal material is inversely proportional to an elastic energy, which is generated when the liquid crystal molecules are changed in orientation, i.e., a smaller elastic energy leads to a longer response time, and a larger elastic energy leads to a shorter response time. As to the elastic energy to be generated when the liquid crystal molecules are changed in orientation, it is known that the splay or bend deformation derives a larger value therefor than the twist deformation.

In consideration thereof, as in the liquid crystal display device of the invention, the comb-like electrode sections are changed in width along the second direction in the pixel electrode so that, at the width-changed portion, liquid crystal molecules are changed in orientation, i.e., subjected to splay or bend deformation. This accordingly increases the elastic energy to be generated when the liquid crystal molecules are changed in orientation compared with the case only with a twist deformation. As a result, in the IPS-mode liquid crystal display device, the response time can be shortened compared with any display device of previous type.

In the comb-like electrode sections of the pixel electrode, to change the width along the second direction for a plurality of times at intervals shorter than the side extending in the first direction, in each of the comb-like electrode sections, a plurality of protruding or recessed portions may be formed, in the second direction, to one of the two sides extending in the first direction.

Alternatively, in each of the comb-like electrode sections, a plurality of protruding portions may be formed, in the second direction, to each of the two sides extending in the first direction, for example. If this is the case, in any two of the adjacent comb-like electrode sections, the protruding portions in the two sides opposing each other via a slit formed between the two of the adjacent comb-like electrode sections may be aligned when viewed from the first direction, or may be slightly misaligned by an amount smaller than the interval between the protruding portions in one of the sides.

Still alternatively, in each of the comb-like electrode sections, a plurality of recessed portions may be formed, in the second direction, to each of the two sides extending in the first direction, for example. Also in this case, in any two of the adjacent comb-like electrode sections, the recessed portions in the two sides opposing each other via a slit formed between the two of the adjacent comb-like electrode sections may be aligned when viewed from the first direction, or may be slightly misaligned by an amount smaller than the interval between the protruding portions in one of the sides.

Still alternatively, in each of the comb-like electrode sections, a protruding portion and a recessed section may be formed alternately in the second direction to each of the two sides extending in the first direction. If this is the case, in any two of the adjacent comb-like electrode sections, the protruding portions and the recessed portions in the two sides opposing each other via a slit formed between the two of the adjacent comb-like electrode sections may be respectively aligned when viewed from the first direction, or may be alternately aligned when viewed from the first direction.

In the liquid crystal display device of the invention, instead of changing the width in each of the comb-like electrode sections in the pixel electrode when viewed from the second direction, the position viewed from the second direction may be changed for a plurality of times at intervals shorter than a side extending in the first direction, and at distances shorter than the width along the second direction. Also in this case, when an electric field is generated due to a potential difference between the pixel and common electrodes, a splay or bend deformation is observed in the orientation of liquid crystal molecules in the comb-like electrode sections at portions where the width is changed along the second direction. This favorably reduces the response time compared with the previous IPS-mode liquid crystal display device.

For each of the comb-like electrode sections of the pixel electrode, to change the position for a plurality of times viewed from the second direction, a plurality of protruding portions may be formed in the second direction to one of the two sides extending in the first direction, and a plurality of recessed portions may be formed in the second direction to the remaining side of the two sides, for example. In this case, in one of the comb-like electrode sections, the protruding portions and the recessed portions in the two sides extending in the first direction are aligned when viewed from the first direction, for example.

Also in this case, in any two of the adjacent comb-like electrode sections, one of the two sides opposing each other via a slit formed between the two of the adjacent comb-like electrode sections may be formed with a plurality of protruding portions in the second direction, and the remaining side of the two sides may be formed with a plurality of recessed portions in the second direction. Alternatively, in any two of the adjacent comb-like electrode sections, the two sides opposing each other via a slit formed between the two of the adjacent comb-like electrode sections may be each formed with a plurality of protruding portions in the second direction or a plurality of recessed portions in the second direction.

In the liquid crystal display device of the invention, the response time can be shortened compared with the previous IPS-mode liquid crystal display deice. Accordingly, when a display change is made from high transmittance, e.g., white display, to low transmittance, e.g., black display, the time for the transmittance to fall and reach a predetermined value can be successfully shortened. As such, compared with the previous IPS-mode liquid crystal display device, the liquid crystal display device of the invention can considerably reduce the response time, and significantly increase the performance of moving image display.

DESCRIPTION OF THE PREFERRED EMBODIMENTS

Figure 1:
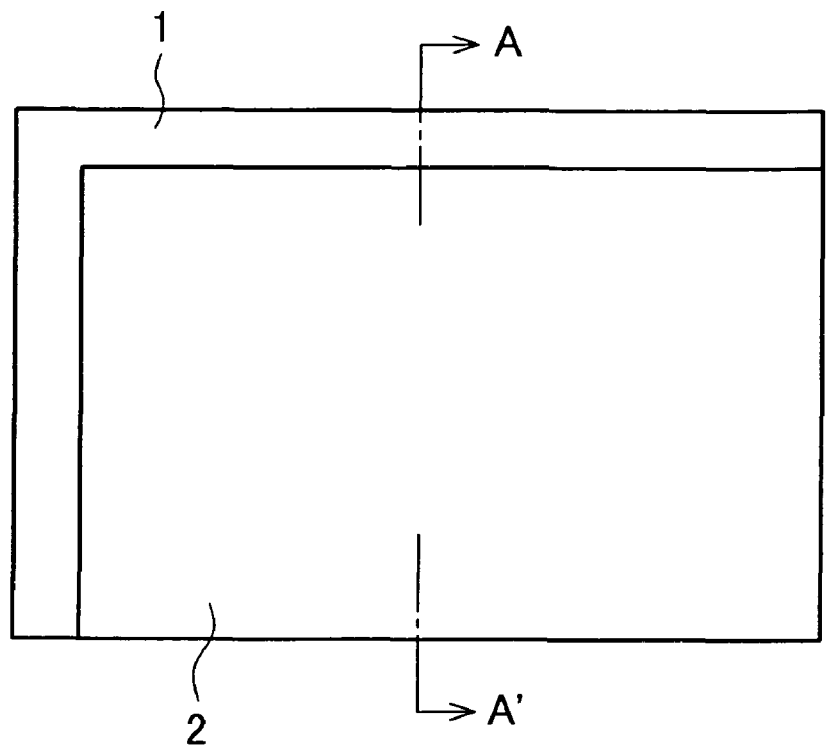
FIG. 1 is a schematic plan view of a liquid crystal display panel, showing the overall configuration thereof.

By referring to the accompanying drawings, embodiments (examples) of the invention are described in details below.

In the drawings for use for describing the examples, any components sharing the same function is provided with the same reference numeral, and not described twice.

The liquid crystal display device of the invention is of IPS mode, as a prerequisite, including a flat-shaped common electrode and a pixel electrode disposed, with an overlay, on one of a pair of substrates sandwiching therebetween a liquid crystal material, via an insulator layer, between the common electrode and the pixel electrode when viewed from above. The pixel electrode is extended in a first direction, and includes a plurality of comb-like electrode sections aligned in a second direction orthogonal to the first direction. In the each of the comb-like electrode sections of the pixel electrode, for example, the width or position along the second direction is changed for a plurality of times at intervals shorter than a side extending in the first direction. This favorably enables to reduce the response time, and increases the response characteristics and the performance of moving image display.

First Example

FIGS. 1 to 7 are each a schematic diagram showing the overall configuration of a liquid crystal display panel for use in a liquid crystal display device in a first example of the invention.

Figure 2:
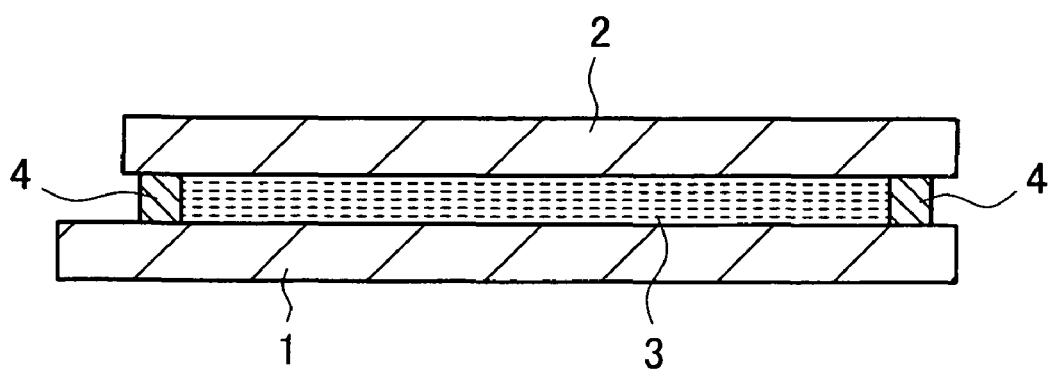
FIG. 2 is a schematic cross sectional view cut along a line A-A' of FIG. 1.
Figure 3:
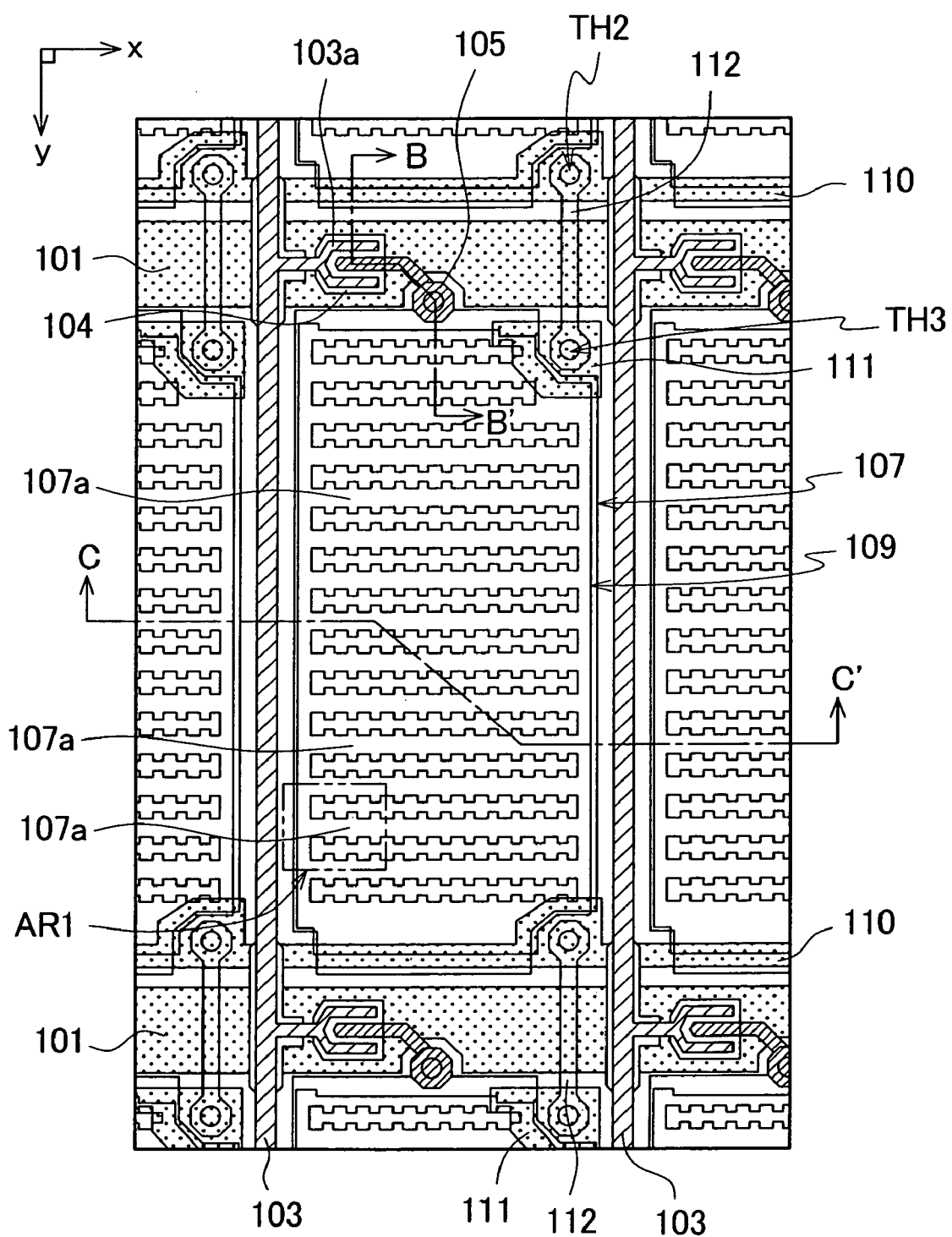
FIG. 3 is a schematic plan view of a TFT (Thin Film Transistor) substrate of a liquid crystal display panel in a first example, showing an exemplary pixel configuration therein.
Figure 4:
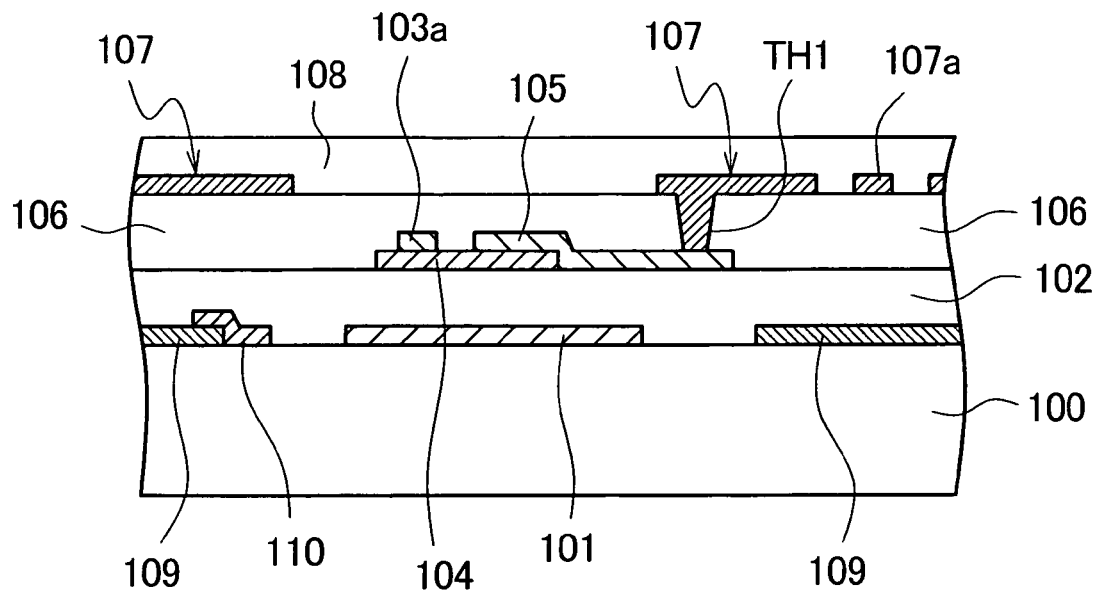
FIG. 4 is a schematic cross sectional view cut along a line B-B' of FIG. 3.
Figure 5:
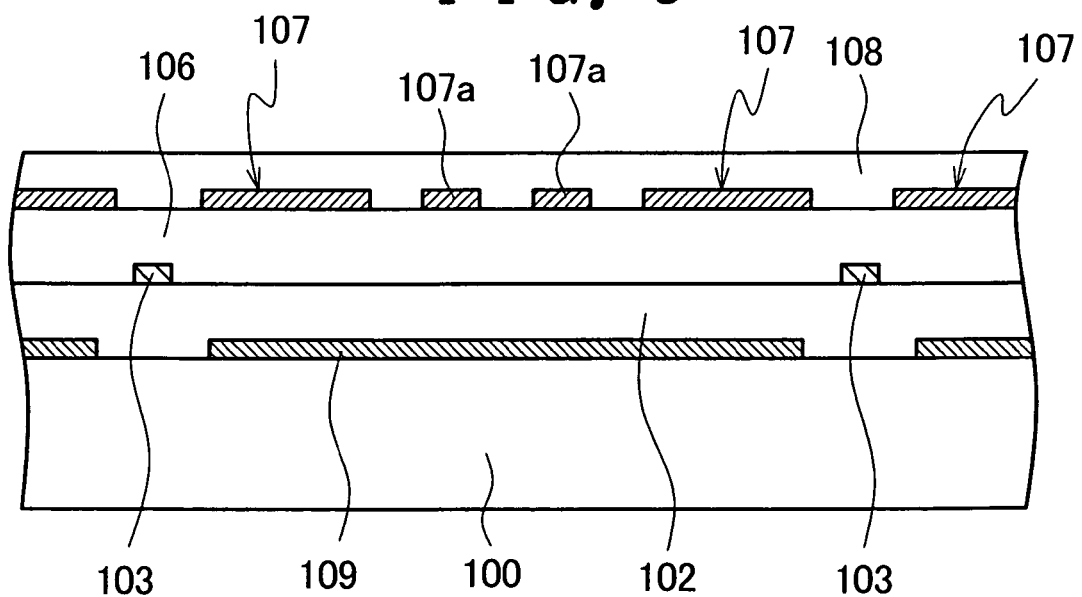
FIG. 5 is a schematic cross sectional view cut along a line C-C' of FIG. 3.
Figure 6:
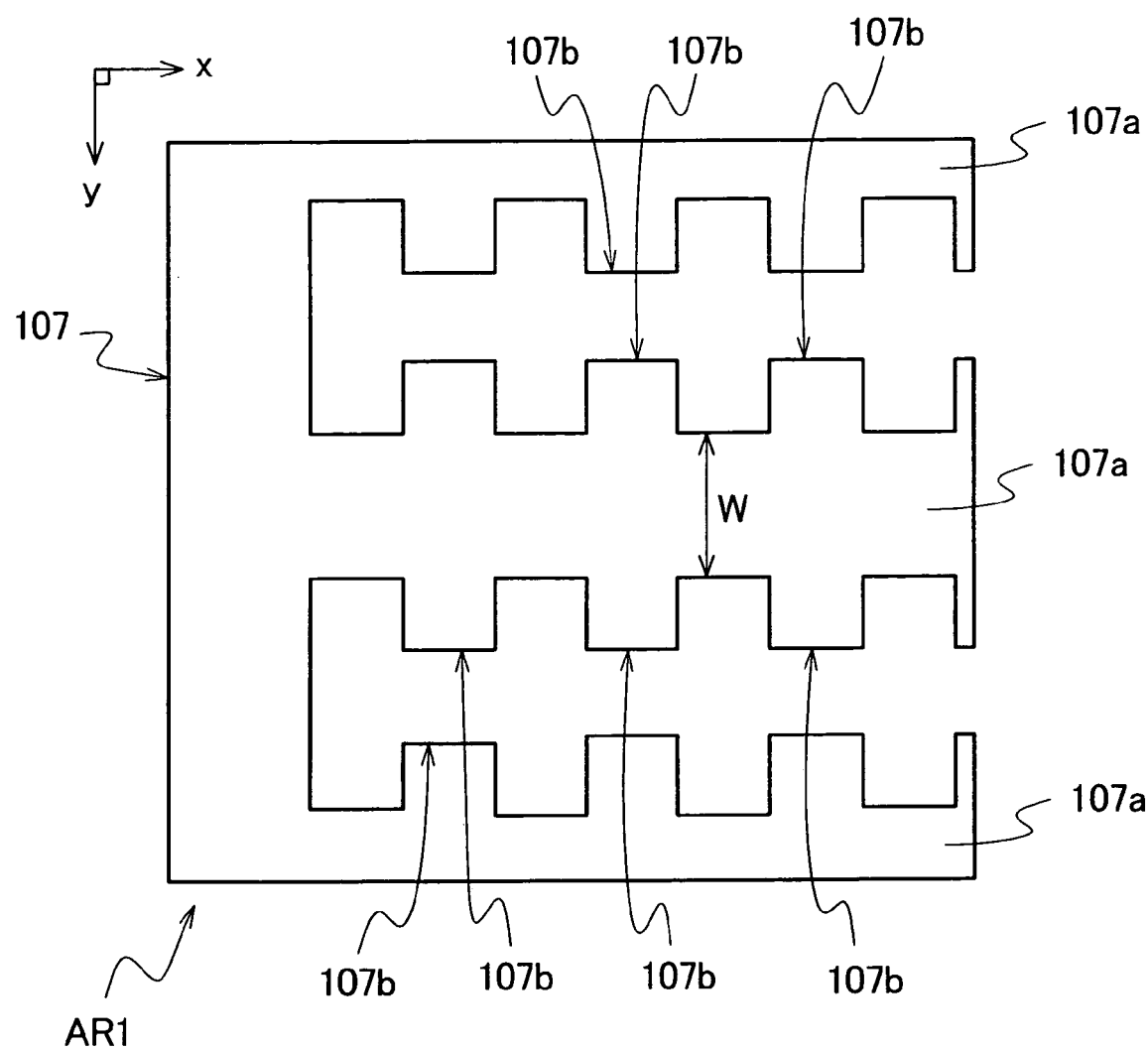
FIG. 6 is a schematic plan view of a pixel electrode in an area AR1 of FIG. 3, showing an exemplary configuration thereof.
Figure 7:
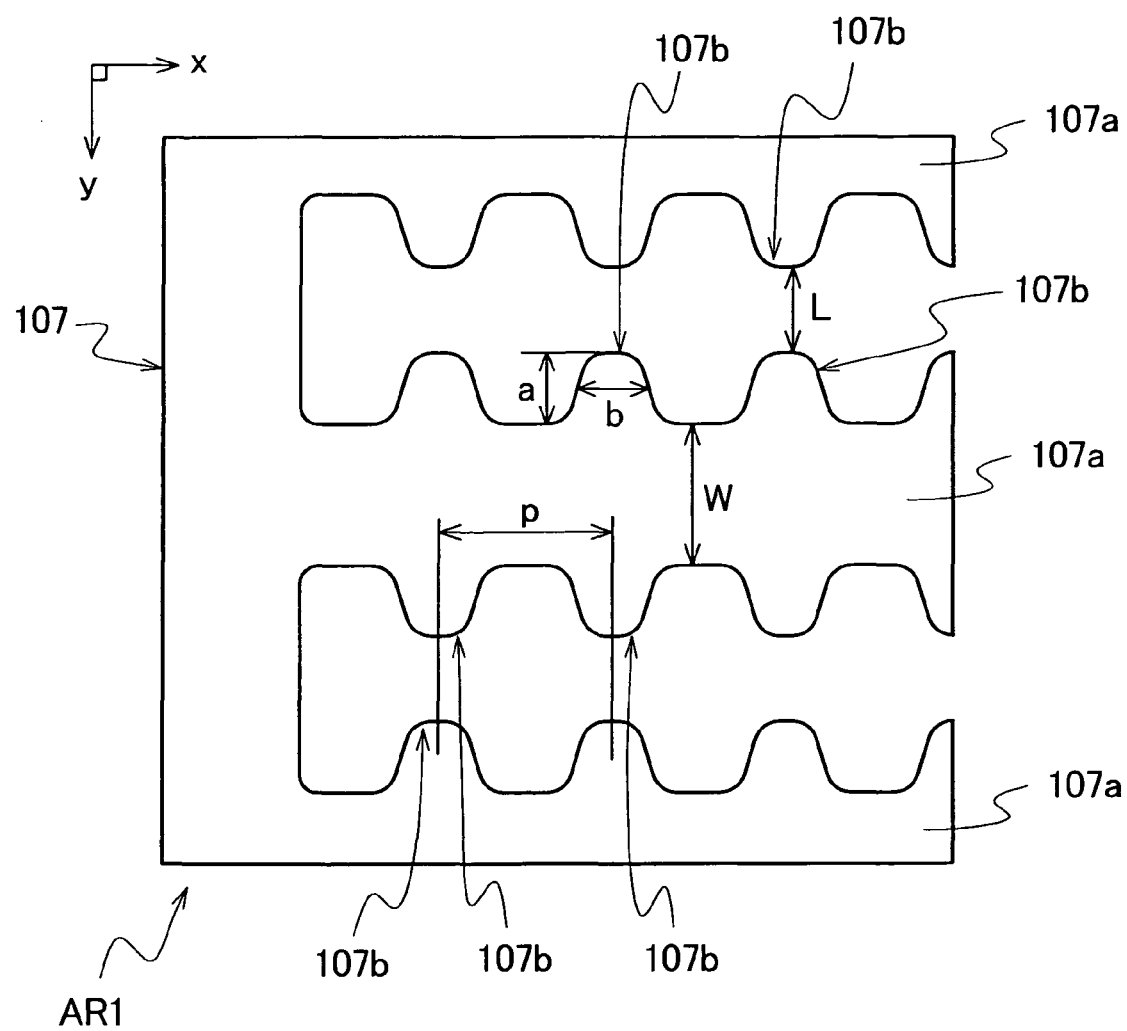
FIG. 7 is a schematic plan view of the pixel electrode in the area AR1 of FIG. 3, showing the actual configuration thereof.

FIG. 1 is a schematic plan view of the liquid crystal display panel, showing the overall configuration thereof. FIG. 2 is a schematic cross sectional view cut along a line A-A' of FIG. 1. FIG. 3 is a schematic plan view of a TFT (Thin Film Transistor) substrate of a liquid crystal display panel in a first example, showing an exemplary pixel configuration therein. FIG. 4 is a schematic cross sectional view cut along a line B-B' of FIG. 3. FIG. 5 is a schematic cross sectional view cut along a line C-C' of FIG. 3. FIG. 6 is a schematic plan view of a pixel electrode in an area AR1 of FIG. 3, showing an exemplary configuration thereof. FIG. 7 is a schematic plan view of the pixel electrode in the area AR1 of FIG. 3, showing the actual configuration thereof.

As shown in FIGS. 1 and 2, for example, the liquid crystal display device in the first example includes a liquid crystal display panel configured by a pair of substrates, i.e., a first substrate 1 and a second substrate 2, sandwiching a liquid crystal material (liquid crystal layer) 3 therebetween.

The first substrate 1 is formed with, on a glass substrate, a video signal line, a scanning signal line, a TFT device, a pixel electrode, a common electrode (referred to also as opposing electrode), and an orientation film, for example. Hereinafter, the first substrate 1 is referred to as TFT substrate 1.

The second substrate 2 is so disposed as to oppose the TFT substrate 1, and is formed with, on a glass substrate, an orientation film, for example. If with a liquid crystal display panel capable of color display, the second substrate 2 is formed with a color filter, for example. Hereinafter, the second substrate 2 is referred to as opposing substrate 2.

In the liquid crystal display device in the first example, a liquid crystal material 3 is with a positive dielectric anisotropy. A ring-shaped sealing material 4 is used to attach together the TFT substrate 1 and the opposing substrate 2 in such a manner as to provide a predetermined space therebetween. The liquid crystal material 3 is tightly filled into a space enclosed by the TFT substrate 1, the opposing substrate 2, and the sealing material 4.

In the liquid crystal display device in the first example, a pixel in the TFT substrate 1 is configured as shown in FIGS. 3 to 5, for example. The outline configuration of the TFT substrate 1 is as below. That is, a glass substrate 100 is formed with, on the surface, a plurality of scanning signal lines 101. On the scanning signal lines 101, a plurality of video signal lines 103 are so provided as to cross over, three-dimensionally, the scanning signal lines 101 via a first insulator layer 102. An area enclosed by any two adjacent scanning signal lines 101 and any two adjacent video signal lines 103 serves as a pixel area. If with a liquid crystal display panel capable of color display, the pixel area is referred to as sub pixel, and a plurality of sub pixels are the unit of dot in the liquid crystal display panel. That is, if with a liquid crystal display panel capable of RGB color display, a dot of the liquid crystal display panel is configured by three sub pixels on the opposing substrate 2, i.e., a sub pixel with a color filter of R (Red), a sub pixel with a color filter of G (Green), and a sub pixel with a color filter of B (Blue).

The scanning signal lines 101 partially serve as a gate of the TFT device, and above a predetermined area of the scanning signal lines 101, a semiconductor layer 104 is disposed via the first insulator layer 102. The video signal lines 103 partially serve as a drain of the TFT device, and each have a branched drain electrode portion 103a in the vicinity of the area of the semiconductor layer 104. This drain electrode portion 103a extends over the semiconductor layer 104. On the first insulator layer 102, a source electrode 105 is disposed together with the video signal line 103 and the semiconductor layer 104.

A pixel electrode 107 is disposed, over a second insulator layer 106, on the components, i.e., the video signal line 103, the semiconductor layer 104, and the source electrode 105. The pixel electrode 107 is electrically connected with the source electrode 105 by a through hole TH1. The pixel electrode 107 is extended along the direction along which the scanning signal lines 101 are extended, i.e., x direction, and includes a plurality of comb-like electrode sections 107a aligned in the direction along which the video signal lines 103 are extended, i.e., y direction.

On the pixel electrode 107, an orientation film 108 is disposed.

In the TFT substrate 1 in the liquid crystal display device in the first example, the glass substrate 100 is disposed with, on the surface, a flat-shaped common electrode 109, for example. The common electrode 109 is so disposed as to overlay, when viewed from above, the pixel electrode 107 via the first and second insulator layers 102 and 106 therebetween. The TFT substrate 1 in the first example includes common signal lines 110 disposed parallel to the scanning signal lines 101. In the pixel area, the common electrodes 109 aligned in the direction along which the scanning signal lines 101 are extended is electrically connected by the common signal lines 110. In the TFT substrate 1 in the first example, an electrical connection is established with the common electrodes 109 aligned in the pixel areas in the direction along which the video signal lines 103 are extended. This electrical connection is established by a conductive pad 111 and a bridge wiring 112, which are electrically connected at an end portion opposite to the end connected to the common signal lines 110. The bridge wiring 112 is formed to the same layer as the pixel electrode 107, and is electrically connected to the common signal lines 110 and the conductive pad 111 by through holes TH2 and TH3.

In the pixel electrode 107 of the TFT substrate 1 in the liquid crystal display device of the first example, as shown in FIG. 6, for example, a plurality of portions 107b are protruding, in the y direction, in the side of the comb-like electrode section 107a extending in the x direction. Such portions 107b are hereinafter referred to as protruding portions. That is, in the pixel electrode 107 of the TFT substrate 1 in the first example, the width W of the comb-like electrode section 107a along the y direction shows a change for a plurality of times at intervals shorter than the side in the x direction. In the example of FIG. 6, the protruding portions 107b are each shaped rectangular, but the protruding portions 107b are actually tapered toward a tip end side as shown in FIG. 7 because the pixel electrode 107 is formed by etching. The shape of the comb-like electrode having the protruding portions each tapered toward the tip end as shown in FIG. 7 is described by parameters as below. That is, an electrode width is W for each of the comb-like electrode sections, and a space is L between the protruding portions formed to the two sides opposing each other via an aperture section, i.e., slit, formed between any two of the comb-like electrode sections. The height, i.e., amplitude of convex portion, is a for the protruding portions in the y direction, and the width, i.e., width of convex portion, is b for the protruding portions at the height half of the amplitude of the convex portion. The space, i.e., pitch of convex portion, is p for the protruding portions formed to one side of the comb-like electrode section.

Described below are the effects and advantages of the liquid crystal display device in the first embodiment. Prior thereto, a brief description is given about an orientation change possibly observed in liquid crystal molecules at the time of application of an electric field to a liquid crystal layer.

Figure 8:
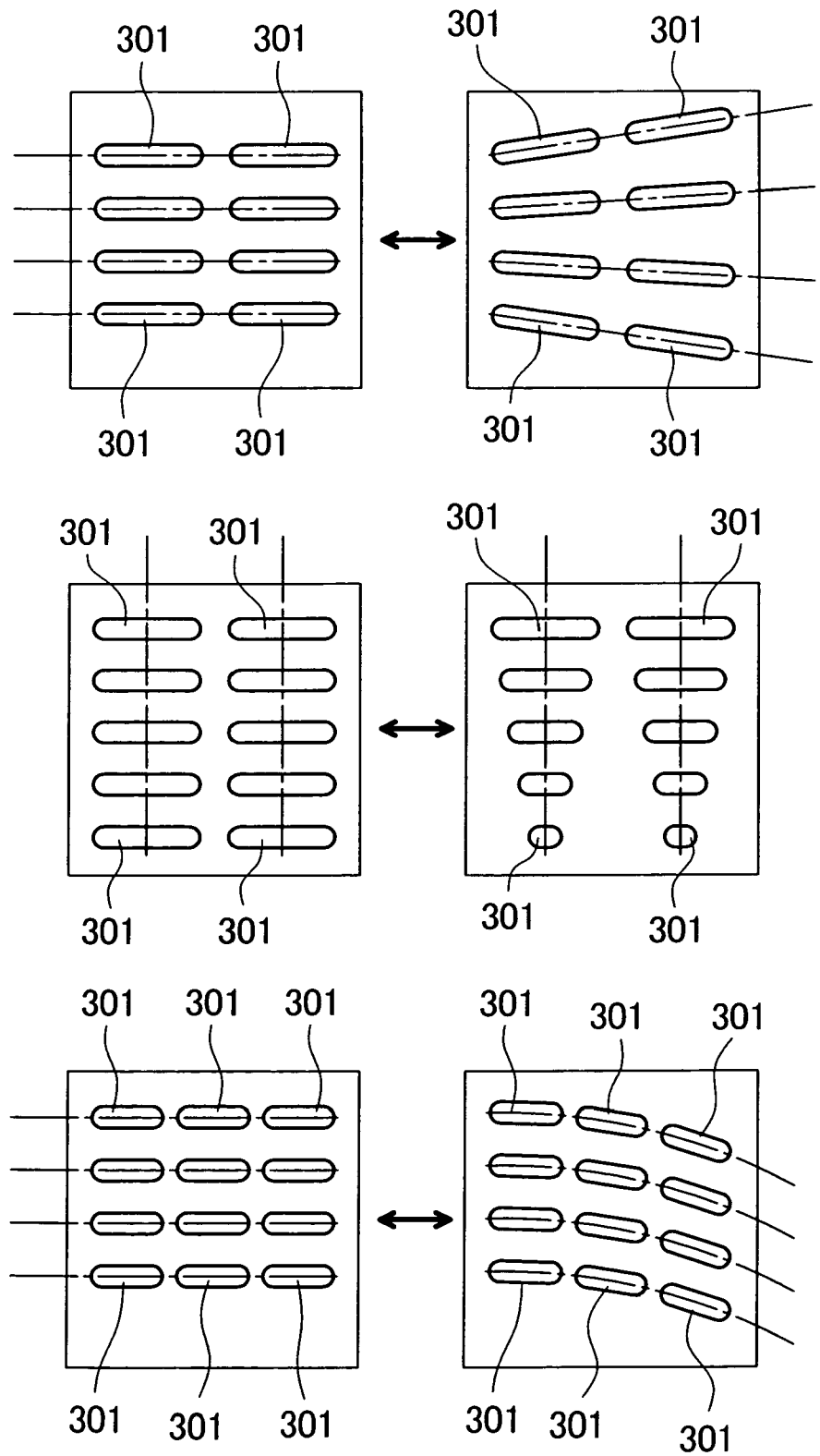
FIG. 8 is a schematic diagram for illustrating possible orientation changes in liquid crystal molecules when an electric field is applied to a liquid crystal layer.

FIG. 8 is a schematic diagram for illustrating possible orientation changes in liquid crystal molecules when an electric field is applied to a liquid crystal layer. FIG. 8 shows three possible orientation changes in the liquid crystal molecules. In FIG. 8, the orientation change at the upper portion is characteristically of splay deformation, the orientation change at the middle portion is characteristically of twist deformation, and the orientation change at the lower portion is characteristically of bend deformation.

In a general liquid crystal display device, an electric field is generated due to a potential difference between a pixel electrode and a common electrode. When the electric field is applied to a liquid crystal layer, liquid crystal molecules in the liquid crystal layer are oriented in the direction of the electric field, i.e., electric line of force, or in the direction vertical to the electric field. With a TN (Twisted Nematic) or IPS (In-Plane Switching) mode, the liquid crystal molecules are oriented in the direction of the electric field. With a VA (Vertical Alignment) mode, the liquid crystal molecules are oriented in the direction vertical to the electric field.

At this time, the liquid crystal molecules show, roughly, three types of orientation change, i.e., splay deformation, twist deformation, and bend deformation. With the splay deformation, when there is no application of electric field, for example, liquid crystal molecules 301 are aligned parallel as shown in the upper left side of FIG. 8. When an electric field is applied, the orientation change occurs so that the spaces between the liquid crystal molecules 301 are increased as shown in the upper right side of FIG. 8.

With the twist deformation, when there is no application of electric field, for example, the liquid crystal molecules 301 are aligned parallel as shown in the middle left side of FIG. 8. When an electric field is applied, the orientation change occurs so that the liquid Crystal molecules 301 are twisted as shown in the middle right side of FIG. 8.

With the bend deformation, when there is no application of electric field, for example, the liquid crystal molecules 301 are aligned linearly as shown in the lower left side of FIG. 8. When an electric field is applied, the orientation change occurs so that the liquid crystal molecules 301 are bent as shown in the lower right side of FIG. 8.

With a liquid crystal display device of IPS mode, the orientation change of the liquid crystal molecules 301 is mainly the twist deformation. Assuming that an elastic constant related to the twist deformation is $k_{22}$, a rise response time $tr_{IPS}$ and a fall response time $tf_{IPS}$ in the IPS-mode liquid crystal display device are represented as Equations 1 and 2 below, for example. For example, refer to Reference Document "Liquid Crystal", 5, pp. 327 to 335 (2001).

[Formula 1]

$$tr_{IPS} = \frac{\gamma 1}{\varepsilon_0 \Delta \varepsilon E^2 - (\pi^2/d^2)k_{22}} \qquad \text{(Equations 1)}$$

$$tf_{IPS} = \frac{\gamma 1 \cdot d^2}{\pi^2 \cdot k_{22}} \qquad \text{(Equations 2)}$$

With a liquid crystal display device of ECB (Electrically Controlled Birefringence) mode, the orientation change of the liquid crystal molecules 301 is mainly the splay deformation. Assuming that an elastic constant related to the splay deformation is $k_{11}$, a rise response time $tr_{ECB}$ and a fall response time $tf_{ECB}$ in the ECB-mode liquid crystal display device are represented as Equations 3 and 4 below according to the above-described Reference Document.

[Formula 2]

$$tr_{ECB} = \frac{\gamma 1}{\varepsilon_0 \Delta \varepsilon E^2 - (\pi^2/d^2)k_{11}} \qquad \text{(Equations 3)}$$

$$tf_{ECB} = \frac{\gamma 1 \cdot d^2}{\pi^2 \cdot k_{11}} \qquad \text{(Equations 4)}$$

With a liquid crystal display device of VA mode, the orientation change of the liquid crystal molecules 301 is mainly the bend deformation. Assuming that an elastic constant related to the bend deformation is $k_{33}$, a rise response time $tr_{VA}$ and a fall response time $tf_{VA}$ in the VA-mode liquid crystal display device are represented as Equations 5 and 6 below according to the above-described Reference Document.

[Formula 3]

$$tr_{VA} = \frac{\gamma 1}{\varepsilon_0 \Delta \varepsilon E^2 - (\pi^2/d^2)k_{33}} \qquad \text{(Equations 5)}$$

$$tf_{VA} = \frac{\gamma 1 \cdot d^2}{\pi^2 \cdot k_{33}} \qquad \text{(Equations 6)}$$

With a liquid crystal display device of TN mode, no one specific deformation occurs, and the deformations of splay, twist, and bend are all possible for molecule orientation. Assuming that an elastic constant related to the deformation observed in the orientation of the liquid crystal molecules 301 in the TN mode is K, the elastic constant K is represented as, according to the above Reference Document, $K=K_{11}+(k_{33}-2 \cdot k_{22})/4$. In the TN-mode liquid crystal display device, a rise response time $tr_{TN}$ and a fall response time $tf_{TN}$ are represented as Equations 7 and 8 below according to the above-described Reference Document.

[Formula 4]

$$tr_{TN} = \frac{\gamma 1}{\varepsilon_0 \Delta \varepsilon E^2 - (\pi^2/d^2)K} \quad \text{(Equations 7)}$$

$$tf_{TN} = \frac{\gamma 1 \cdot d^2}{\pi^2 \cdot K} \quad \text{(Equations 8)}$$

$$K = k_{11} + (k_{33} - 2 \cdot k_{22})/4$$

According to the above-described Reference Document, the elastic constant $k_{22}$ related to the twist deformation is of about one half to one third of the elastic constant $k_{11}$ related to the splay deformation and the elastic constant $k_{33}$ related to the bend deformation. As is evident from the equations 1 to 8, the rise and fall response times are inversely proportional to the value of the elastic constant, i.e., a larger elastic constant leads to a shorter response time. Therefore, in the IPS-mode liquid crystal display device mainly with the twist deformation, the rise and fall response times are twice or three times longer than those in the liquid crystal display devices of TN mode, VA mode, and ECB mode.

In consideration thereof, in the liquid crystal display device in the first example, the comb-like electrode sections 107a in the pixel electrode 107 are so shaped as to have the protruding portions 107b as shown in FIG. 7. The comb-like electrode sections 107a formed as such induce splay or bend deformation, thereby favorably reducing the rise and fall response times.

Figure 9:
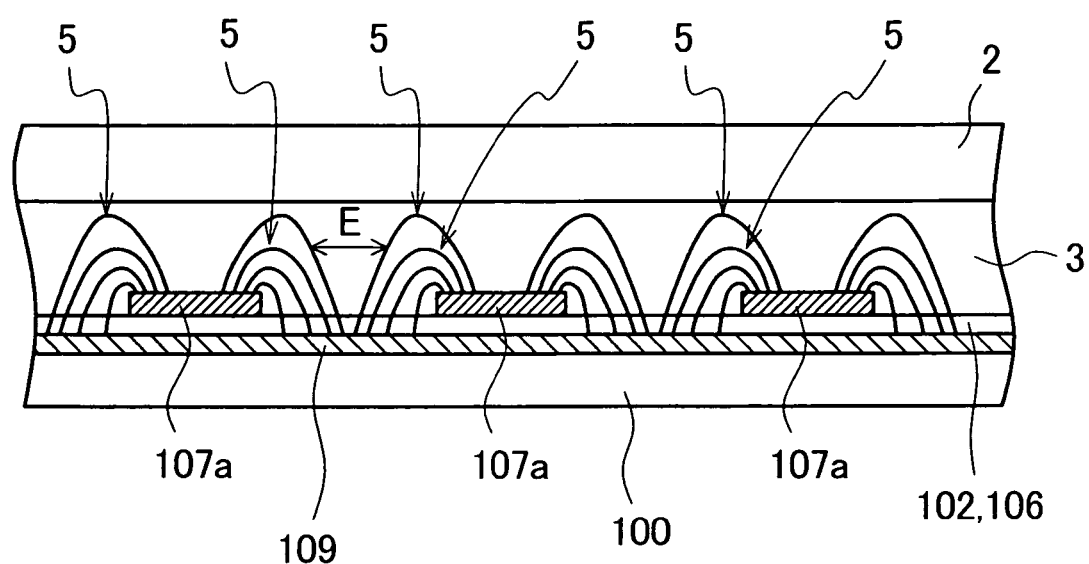
FIG. 9 is a schematic cross sectional diagram showing an electric field for application to a liquid crystal layer in the liquid crystal display device of the first example.
Figure 10:
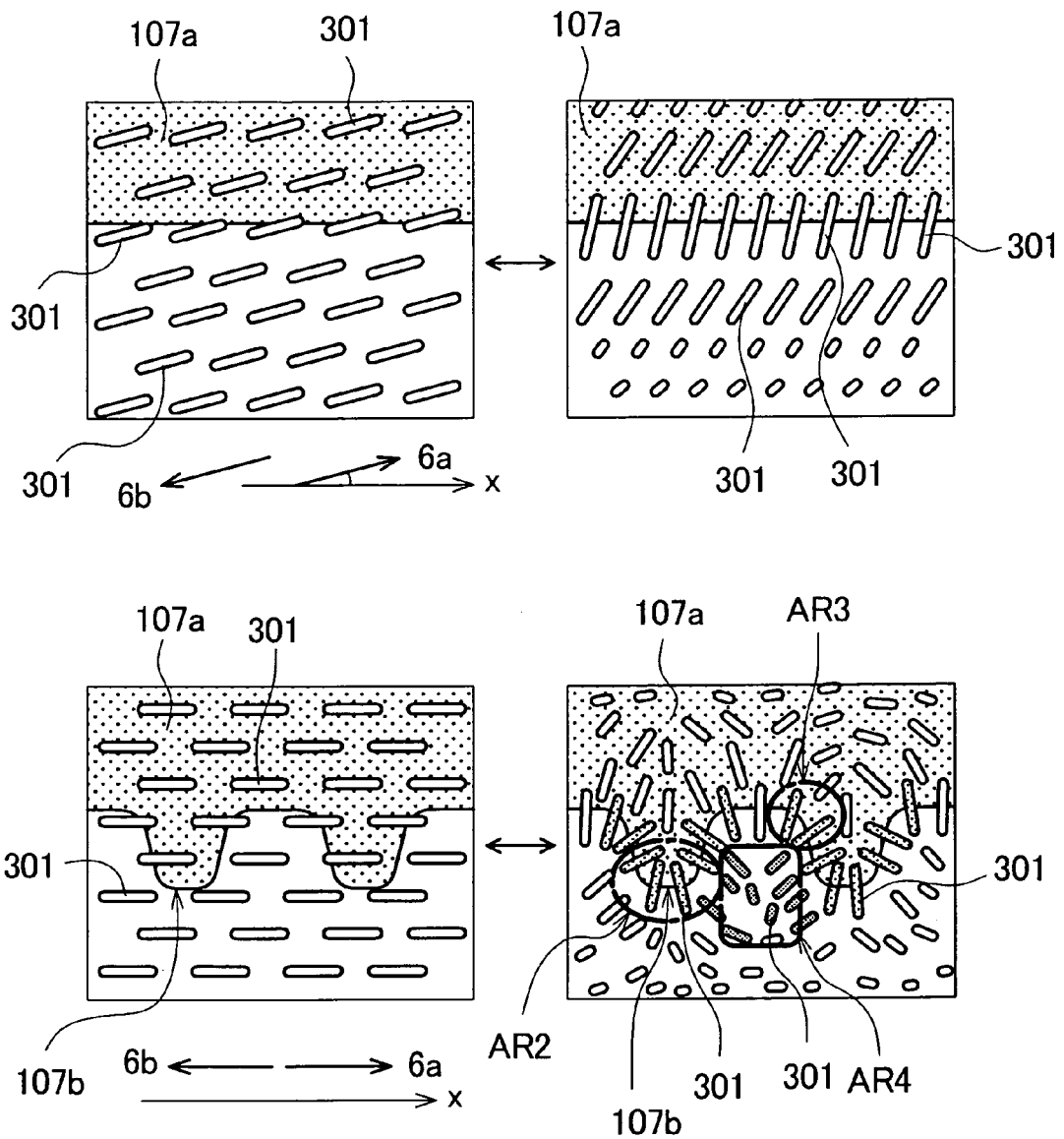
FIG. 10 is a schematic plan view for use for a comparison between a previous liquid crystal display device and the liquid crystal display device in the first example in terms of orientation change in liquid crystal molecules.

FIGS. 9 and 10 are each a schematic diagram for illustrating the effects and advantages of the liquid crystal display device in the first example. FIG. 9 is a schematic cross sectional diagram showing an electric field for application to the liquid crystal layer in the liquid crystal display device of the first example. FIG. 10 is a schematic plan view for use for a comparison between a previous liquid crystal display device and the liquid crystal display device in the first example in terms of orientation change in liquid crystal molecules. Note that, in FIG. 10, the upper portion shows a schematic plan view of liquid crystal molecules in the previous liquid crystal display device, showing their orientation change thereof, and the lower portion shows a schematic plan view of liquid crystal molecules in the liquid crystal display device in the first example, showing the orientation change thereof.

As exemplarily shown in FIG. 9, in the liquid crystal display device in the first example, the flat-shaped common electrode 109 is formed thereon with the pixel electrodes 107, i.e., comb-like electrode sections 107a, via the insulator layers 102 and 106. On the pixel electrodes 107, the liquid crystal layer 3 is disposed via an orientation film that is not shown.

In this configuration, when a potential difference is generated between the comb-like electrode sections 107a, i.e., the pixel electrodes 107, and the common electrode 109, an electric field E, i.e., electric lines of force 5, of FIG. 9 is generated. At this time, because the electric lines of force 5 gather at the end portions of the comb-like electrode sections 107a, the orientation of the liquid crystal molecules 301 located above the end portions can be greatly changed. For this reason, the liquid crystal molecules 301 at the end portions of the comb-like electrode sections 107a are observed for their orientation change in both the previous liquid crystal display device and the liquid crystal display device in the first example. The comb-like electrode sections 107a in the previous liquid crystal molecules 301 display device have no protruding portion. The result looks like shown in FIG. 10.

In the previous liquid crystal display device in which the comb-like electrode sections 107a have no protruding portion, when no electric field is applied to a liquid crystal layer, as shown in the upper left side of FIG. 10, the liquid crystal molecules are tilted about 5 to 20 degrees in the direction along which the comb-like electrode sections 107a are extended, i.e., x direction. This is almost the same directions 6a and 6b of rubbing to the orientation film. Note that the rubbing direction 6a for the orientation film of the TFT substrate 1 is opposite, i.e., antiparallel, to the rubbing direction 6b for the orientation film of the opposing substrate 2.

Also in the previous liquid crystal display device in which the comb-like electrode sections 107a have no protruding portion, when an electric field is applied to a liquid crystal layer, the liquid crystal molecules 301 are twisted and show an orientation change as shown in the upper right side of FIG. 10. In the previous liquid crystal display device, because the end portions, i.e., the sides, of the comb-like electrode sections 107a are formed simply linear, the electric field, i.e., the electric lines of force 5, is directed in almost the same direction when viewed from positions along the x direction. As such, the orientation of the liquid crystal molecules 301 is changed similarly over the entire end portions of the comb-like electrode sections 107a.

In the liquid crystal display device in the first example, when no electric field is applied to a liquid crystal layer, as shown in the lower left side of FIG. 10, the liquid crystal molecules 301 are so oriented as to be almost parallel to the direction along which the comb-like electrode sections 107a are extended, i.e., x direction. This is almost the same directions 6a and 6b of rubbing to the orientation film.

Also in the liquid crystal display device in the first example, when an electric field is applied to a liquid crystal layer, the orientation of the liquid crystal molecules 301 is changed as shown in the lower right of FIG. 10. In the liquid crystal display device in the first example, the sides of the comb-like electrode sections 107a are not oriented in the x direction in the vicinity of the protruding portions 107b of the comb-like electrode sections 107a. In the vicinity of the protruding portions 107b, the electric lines of force 5 are also changed in direction to match the orientation of the sides so that the orientation of the liquid crystal molecules 301 is changed. As such, the liquid crystal molecules 301 located above the protruding portions 107b show the splay deformation as in areas AR2 and AR3 in the lower right of FIG. 10. The liquid crystal molecules located between any two protruding portions 107b show the bend deformation as in an area AR4 in the lower right of FIG. 10. That is, the elastic constant related to the orientation change of the liquid crystal molecules 301 for the portions includes not only the elastic constant $k_{22}$ but also the elastic constants $k_{11}$ and $k_{33}$, and thus is larger than the elastic constant in the previous IPS-mode liquid crystal display device. Here, the elastic constant $k_{22}$ is the one related to the twist deformation, the elastic constant $k_{11}$ is the one related to the splay deformation, and the elastic constant $k_{33}$ is the one related to the bend deformation. As a result, the rise and fall response times are shortened as are inversely proportional to the elastic constant.

Figure 11:
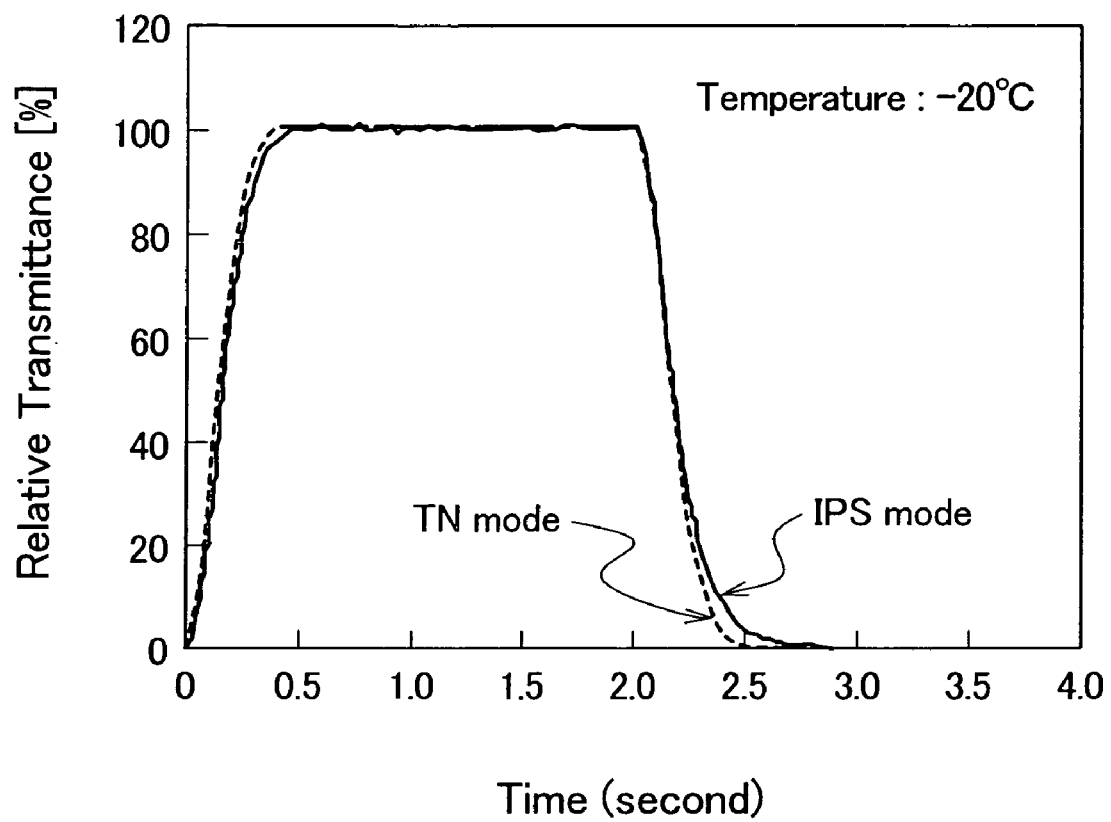
FIG. 11 is a graph showing the temporal change of a relative transmittance for illustrating another effect in the first example.

FIG. 11 is a graph showing the temporal change of a relative transmittance for illustrating another effect in the first example.

As described in the foregoing, the previous IPS-mode liquid crystal display device has the problem of longer response time compared with a VA-mode liquid crystal display device. This problem resultantly causes another problem of, if a display change is made from high transmittance to low transmittance, taking a longer time for the transmittance to fall and reach a predetermined value.

The previous liquid crystal display device of IPS mode and a liquid crystal display device of TN mode are observed for their temporal changes in the relative transmittance. The result looks like shown in FIG. 11. FIG. 11 is a graph showing a response curve of the TN liquid crystal display device together with that of the IPS-mode liquid crystal display device.

The response curves of FIG. 11 tell that the response time of the IPS mode (indicated by a solid line) is longer than the response time of the TN mode (indicated by a dotted line), i.e., with a relatively short temporal difference of about 0.1 second. The response time indicates the length of time taken for the relative transmittance to reach 100% after the transmittance change from the state of 0% to the state of 100%.

If with the transmittance change from the state of 0% to the state of 100%, on the other hand, the response curves of FIG. 11 tell the comparison result that the response time to reach the transmittance of 100% of the IPS mode (indicated by a solid line) is longer than the response time of the TN mode (indicated by a dotted line), i.e., longer about 0.2 to 0.3 seconds. The time taken for the relative transmittance to reach 0% from the level of about 10% is especially long. That is, the previous IPS-mode liquid crystal display device has a problem of, if a display change is made from white display to black display, taking a longer time to have the black display compared with a TN-mode liquid crystal display device.

Such a problem about the display change is related to the size, i.e., increase ratio, of an elastic energy when liquid crystal molecules shows an orientation change in response to application of an electric field to a liquid crystal layer. The elastic energy $f_{ela}$ as a result of the orientation change occurred to the liquid crystal molecules is represented as the following equation 9, where an elastic constant related to the splay deformation is $k_{11}$, an elastic constant related to the twist deformation is $k_{22}$, and an elastic constant related to the bend deformation is $k_{33}$.

[Formula 5]

$$f_{ela} = \frac{1}{2}k_{11}(\nabla \cdot n)^2 + \frac{1}{2}k_{22}(n \cdot \nabla \times n)^2 + \frac{1}{2}k_{33}(n \times (\nabla \times n))^2 \quad \text{(Equations 9)}$$

With the previous IPS-mode liquid crystal display device, the orientation change observed in liquid crystal molecules is mainly the twist deformation. The equation 9 thus can be approximated as the following equation 10.

[Formula 6]

$$f_{ela} \cong \frac{1}{2}k_{22}(n \cdot \nabla \times n)^2 \quad \text{(Equations 10)}$$

As described in the foregoing, the elastic constant $k_{22}$ related to the twist deformation is of about one half to one third of the elastic constant $k_{11}$ related to the splay deformation and the elastic constant $k_{33}$ related to the bend deformation. For this reason, in the previous IPS-mode liquid crystal display device, the elastic energy is lower than in a VA-mode liquid crystal display device mainly with the bend deformation and in a TN-mode liquid crystal display device with the mixture of splay, twist, and bend deformations. As a result, in the previous IPS-mode liquid crystal display device, the resilience related to the increase of an elastic energy is low, and after the application of an electric field, it thus takes long for any orientation-changed liquid crystal molecules to be back to their original orientation under no application of electric field.

On the other hand, in the liquid crystal display device in the first example, the comb-like electrode sections 107a of the pixel electrode are provided with the protruding portions 107b, and the comb-like electrode sections 107a formed as such induce splay or bend deformation to the orientation of the liquid crystal molecules 301 in the vicinity of the protruding portions 107b. As such, the elastic energy in the liquid crystal display device in the first example is represented as the equation 9, and compared with the previous IPS-mode liquid crystal display device, the increase ratio is increased for the elastic energy as a result of orientation change occurred to the liquid crystal molecules 301. This accordingly increases the resilience for the liquid crystal molecules in terms of orientation, and after the application of an electric field, the time can be reduced for any orientation-changed liquid crystal molecules to be back to their original orientation under no application of electric field.

As such, with the IPS-mode liquid crystal display device in the first example, the response time can be reduced and the performance of moving image display can be improved compared with the previous IPS-mode liquid crystal display device.

The inventors of the invention, in the liquid crystal display device in the first example, conduct a study of the relationship among the shape, the response characteristics, and the transmittance of the comb-like electrode sections 107a of the pixel electrode 107 formed with the protruding portions 107b as shown in FIG. 7. To be specific, the response time and transmittance are subjected to a comparison by varying the values of the electrode width W, the space L, the height a, the width b, and the interval p. The electrode width W is of the come-like electrode section 107a of FIG. 7, and the space L is of between the protruding portions 107b formed to the two sides opposing each other via an aperture section, i.e., slit, formed between any two comb-like electrode sections 107a. The height a is of the protruding portion 107b in the y direction, i.e., amplitude of convex portion, the width b is of the protruding portion 107b at half of the height of the amplitude of convex portion, i.e., width of convex portion, and the interval p is of between the protruding portions 107b formed to one side of the comb-like electrode section 107a, i.e., pitch of convex portion. Table 1 shows an exemplary result of the comparison.

TABLE 1

PIXEL ELECTRODE SHAPED AS SHOWN IN FIG. 7;
SHAPE-RESPONSE TIME-TRANSMITTANCE RELATIONSHIP

| PIXEL ELECTRODE SHAPE | RUBBING ANGLE (°) | (μm) | (μm) | (μm) | (μm) | (μm) | p (μm) | RESPONSE TIME (ms) | TRANSMITTANCE (%) |
|---|---|---|---|---|---|---|---|---|---|
| EXAMPLE 1 (FIG. 7) | 0 | | | | | | | 6 | .6 |
| | | | | | | | | 7 | .3 |
| | | | | | | 0 | | 3 | .6 |
| PREVIOUS EXAMPLE | 0 | | | | | | | 3 | .6 |

Note that the response time and the transmittance are both examined by a computer simulation. With the model used for the simulation, the common electrode 109 has the coating thickness of 140 nm, the pixel electrode 107 has the coating thickness of 77 nm, the thickness is 700 nm for both the first and second insulator layers 102 and 106 disposed via the common and pixel electrodes 109 and 107, and the orientation film 108 has the film thickness of 100 nm. The liquid crystal material 3 has a dielectric anisotropy $\Delta \in$ of 4.0, a birefringence anisotropy $\Delta n$ of 0.103, a rotation viscosity $\gamma 1$ of 67 (mPa·s), and an NI point of 70.5° C. The liquid crystal layer has the thickness, i.e., cell gap, of 4.0 μm.

Table 1 also shows, for comparison use, the response time and the transmittance in the previous IPS-mode liquid crystal display device including no protruding portion.

In some cases, Table 1 shows that the response time is shortened but the transmittance remains the same compared with the previous IPS-mode liquid crystal display device. The cases include when the electrode width W and the space L between the protruding portions 107b are set to the values of the previous device, and the rubbing angle is set to 10 degrees as is the same as the previous device, and when the protrusion portion 107b is provided at intervals of 4 μm, i.e., convex-portion pitch p=4 μm. The protruding portion 107b here has the convex-portion amplitude a of 2 μm and the convex-portion width b of 2 μm.

If the electrode width W stays the same but the convex-portion amplitude a and the convex-portion width b are both increased, and the space L is reduced for the protruding portions 107b, the response time is reduced to a further extent, and the transmittance is accordingly reduced.

That is, in the liquid crystal display device in the first example, the protruding portions 107b provided to the comb-like electrode section 107a of the pixel electrode are preferably defined by the shape in consideration of the relationship among three shape parameters of a, b, and p-b, the fall response characteristics, and the transmittance.

Figure 12:
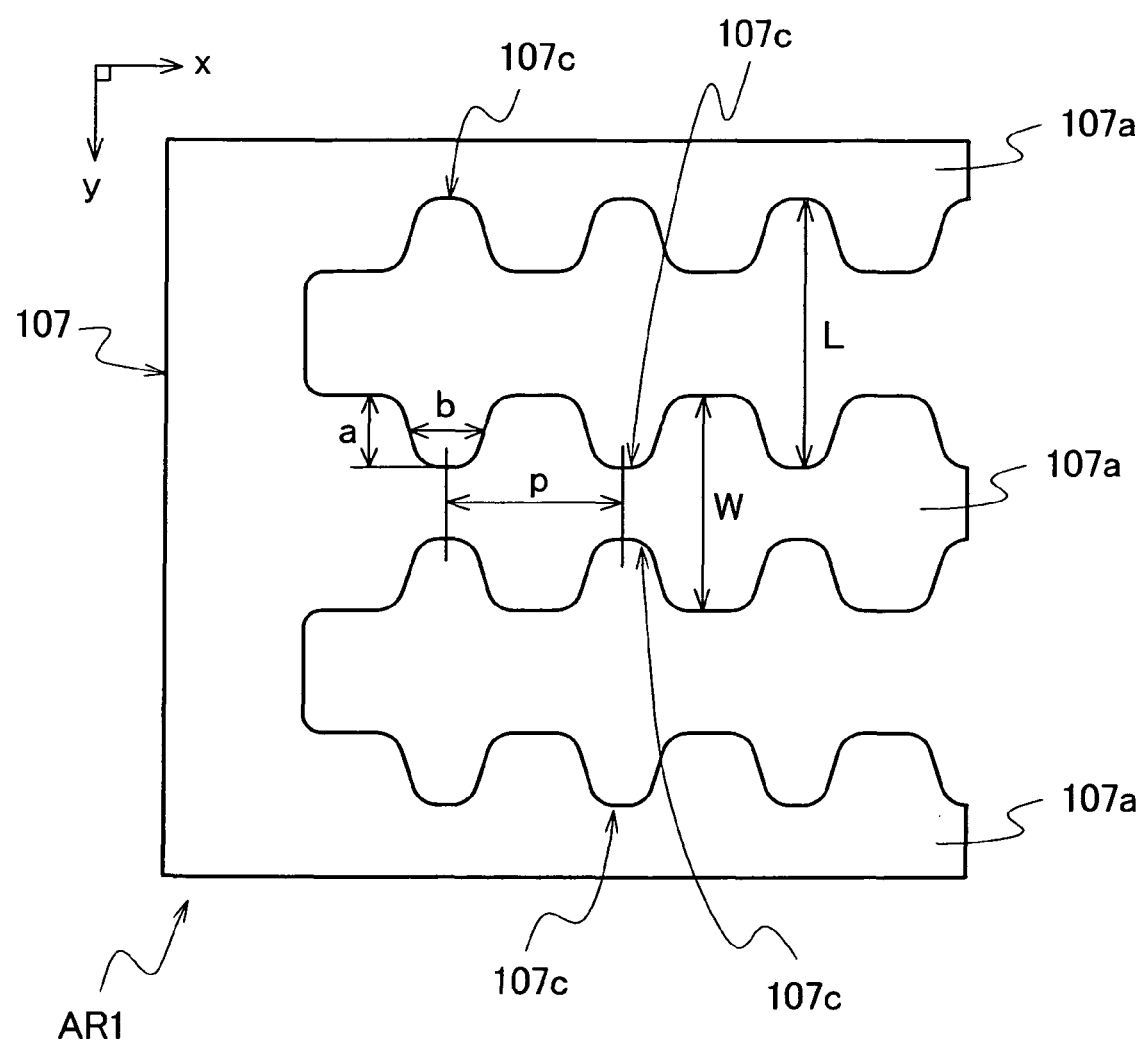
FIG. 12 is a schematic diagram for illustrating a first modified example of the liquid crystal display device in the first example.

FIG. 12 is a schematic diagram for illustrating a first modified example of the liquid crystal display device in the first example. Note that, similarly to FIG. 7, FIG. 12 is a schematic plan view of the pixel electrode in the area AR1 of FIG. 3, showing only the configuration thereof.

In the liquid crystal display device in the first example, as shown in FIG. 7, for example, the protruding portions 107b are protruded in the y direction from a side along which the comb-like electrode sections 107a of the pixel electrode 107 are extended, i.e., x direction, so that the comb-like electrode sections 107a are varied in width in the y direction. The comb-like electrode sections 107a formed as such induce splay or bend deformation to the orientation of the liquid crystal molecules. To induce splay or bend deformation to the orientation of the liquid crystal molecules, providing the protruding portions 107b as such is not the only option, and as shown in FIG. 12, for example, the comb-like electrode section 107a with the electrode width of W may be formed with a concave portion 107c, which is recessed in the y direction. With this being the case, i.e., the comb-like electrode section 107a is formed with the concave portion 107c, the splay and bend deformations are induced as in the case of including the protruding portions 107b because the side of the comb-like electrode section 107a along the x direction is changed in direction due to the concave portion 107c. As a result, compared with the previous IPS-mode liquid crystal display device including no concave portion 107c, the response time is accordingly reduced.

In consideration thereof, the inventors of the invention conduct a study of the relationship among the shape, the response characteristics, and the transmittance of the comb-like electrode sections 107a of the pixel electrode 107 formed with the concave portions 107c as shown in FIG. 12. To be specific, the response time and transmittance are subjected to a comparison by varying the values of the electrode width W, the space L, the depth a, the width b, and the interval p. The electrode width W is of the come-like electrode section 107a, and the space L is of between the concave portions 107c formed to the two sides opposing each other via an aperture section, i.e., slit, formed between any two comb-like electrode sections 107a. The depth a is of the concave portion 107c in the y direction, i.e., amplitude of concave portion, the width b is of the concave portion 107c at half of the height of the amplitude of convex portion, i.e., width of concave portion, and the interval p is of between the concave portions 107c formed to one side of the comb-like electrode section 107a, i.e., pitch of concave portion. Table 2 shows an exemplary result of the comparison.

TABLE 2

PIXEL ELECTRODE SHAPED AS SHOWN IN FIG. 12;
SHAPE-RESPONSE TIME-TRANSMITTANCE RELATIONSHIP

| [00194] PIXEL ELECTRODE SHAPE | [00195] RUBBING ANGLE (°) | [00196] (μm) | [00197] (μm) | [00198] (μm) | [00199] (μm) | [00200] (μm) | [00201] p (μm) | [00202] RESPONSE TIME (ms) | [00203] TRANSMITTANCE [00204] % |
|---|---|---|---|---|---|---|---|---|---|
| [00205] EXAMPLE 1 (FIG. 12) | [00206] 0 | [00207] | [00208] | [00209] | [00210] | [00211] | [00212] | [00213] 8 | [00214] .6 |
| | [00215] | [00216] | [00217] | [00218] | [00219] | [00220] | [00221] | [00222] 9 | [00223] .9 |
| | [00224] | [00225] | [00226] | [00227] | [00228] 0 | [00229] | [00230] | [00231] 5 | [00232] .9 |
| [00233] REVIOUS EXAMPLE | [00234] 0 | [00235] | [00236] | [00237] | [00238] | [00239] | [00240] | [00241] 3 | [00242] .6 |

Note that the response time and the transmittance are both examined by a computer simulation. With the model used for the simulation, the common electrode 109 has the coating thickness of 140 nm, the pixel electrode 107 has the coating thickness of 77 nm, the thickness is 700 nm for both the first and second insulator layers 102 and 106 disposed via the common and pixel electrodes 109 and 107, and the orientation film 108 has the film thickness of 100 nm. The liquid crystal material 3 has a dielectric anisotropy $\Delta\in$ of 4.0, a birefringence anisotropy $\Delta n$ of 0.103, a rotation viscosity $\gamma 1$ of 67 (mPa·s), an NI point of 70.5° C. The liquid crystal layer has the thickness, i.e., cell gap, of 4.0 μm.

Table 2 also shows, for comparison use, the response time and the transmittance in the previous IPS-mode liquid crystal display device including no protruding portion.

In some cases, Table 2 shows that the response time is shortened but the transmittance remains the same compared with the previous IPS-mode liquid crystal display device. The cases include when the electrode width W and the space L between the concave portions 107c are set to the values of the previous device, and the rubbing angle is set to 10 degrees as is the same as the previous device, and when the concave portion is provided at intervals of 4 μm. The convex portion 107c here has the concave-portion amplitude a of 2 μm and the concave-portion width b of 2 μm.

If the electrode width W stays the same but the concave-portion amplitude a and the concave-portion width b are both increased, and the space L is reduced for the concave portions 107c, the response time is reduced to a further extent, and the transmittance is accordingly reduced.

That is, similarly to the case of including the protruding portions 107b, when the comb-like electrode sections 107a of the pixel electrode are each formed with the concave portions 107c of FIG. 12, the response time can be also reduced, and the performance of moving image display can be improved for the IPS-mode liquid crystal display device.

Figure 13:
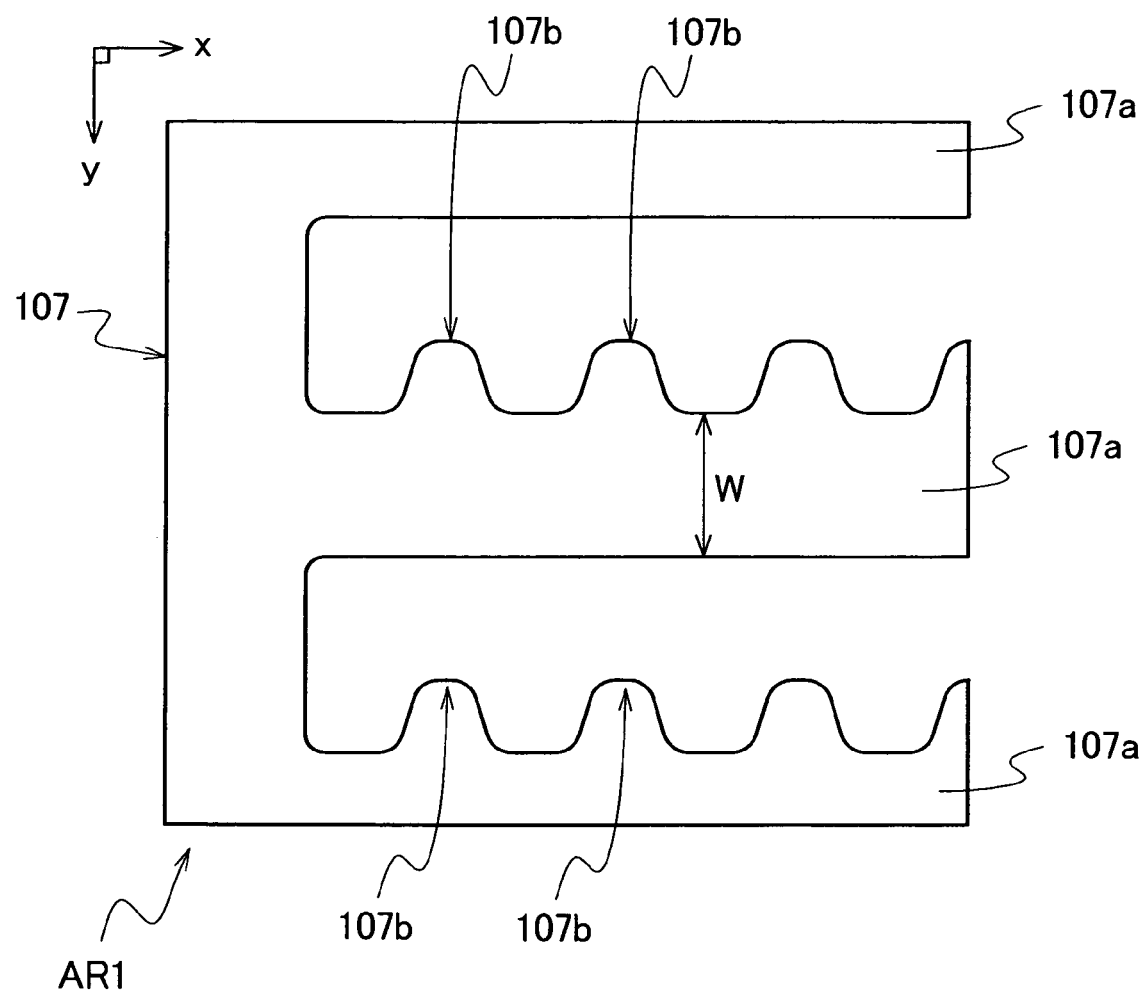
FIG. 13 is a schematic diagram for illustrating a second modified example of the liquid crystal display device in the first example.
Figure 14:
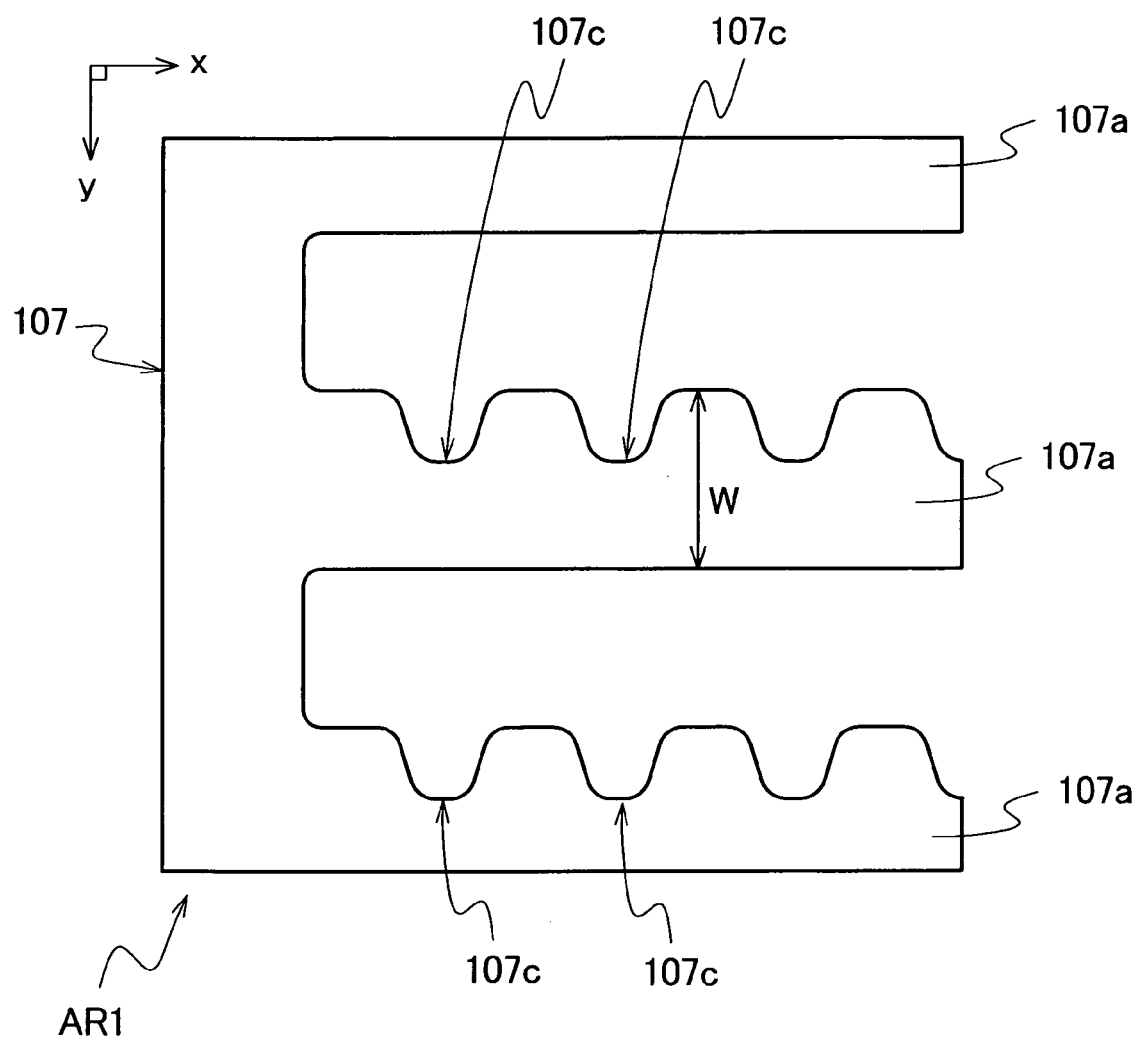
FIG. 14 is a schematic diagram for illustrating a third modified example of the liquid crystal display device in the first example.

FIG. 13 is a schematic diagram for illustrating a second modified example of the liquid crystal display device in the first example. FIG. 14 is a schematic diagram for illustrating a third modified example of the liquid crystal display device in the first example. Note that, similarly to FIG. 7, FIGS. 13 and 14 are each a schematic plan view of the pixel electrode in the area AR1 of FIG. 3, showing only the configuration thereof.

In the liquid crystal display device in the first example, as shown in FIG. 7, for example, the protruding portions 107b are protruded from each of the two sides along which the comb-like electrode sections 107a of the pixel electrode 107 are extended, i.e., x direction. This is surely not restrictive, and as shown in FIG. 13, the protruding portions 107b may be provided only to one of the two sides along which the comb-like electrode sections 107a of the pixel electrode 107 are extended, i.e., x direction. Similarly, as shown in FIG. 14, for example, the concave portions 107c may be provided only to one of the two sides along which the comb-like electrode sections 107a of the pixel electrode 107 are extended, i.e., x direction. If this is the case, desirably, the comb-like electrode sections 107a are formed as shown in FIGS. 13 and 14, e.g., formed with the protruding portions 107b or the concave portions 107c only in one of the two sides opposing each other via a slit formed between any two adjacent comb-like electrode sections 107a.

Figure 15:
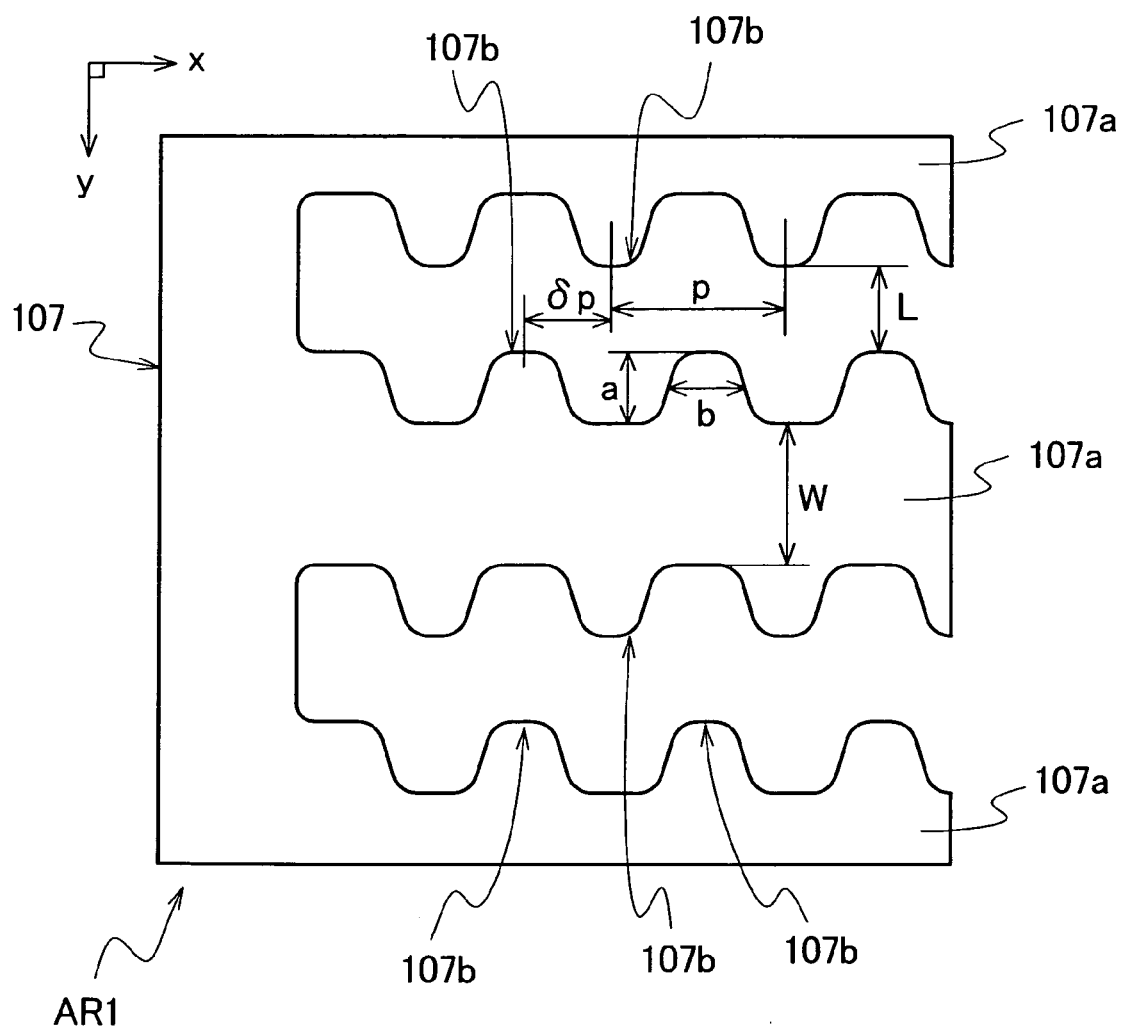
FIG. 15 is a schematic diagram for illustrating a fourth modified example of the liquid crystal display device in the first example.

FIG. 15 is a schematic diagram for illustrating a fourth modified example of the liquid crystal display device in the first example. Note that, similarly to FIG. 7, FIG. 15 is a schematic plan view of the pixel electrode in the area AR1 of FIG. 3, showing only the configuration thereof.

In the liquid crystal display device in the first example, as shown in FIG. 7, for example, the two protruding portions 107b opposing each other via a slit formed between any two adjacent comb-like electrode sections 107a are aligned when viewed from the x direction. This is surely not restrictive, and as shown in FIG. 15, for example, the two protruding portions 107b opposing each other via a slit formed between any two adjacent comb-like electrode sections 107a may be misaligned, when viewed from the x direction, by an amount of the interval; $\delta p$ smaller than the interval p between the protruding portions 107b on one side. Note here that the misalignment Sp observed in the protruding portions when viewed from the x direction is preferably one half of the interval p, i.e., p/2, between the protruding portions 107b on one side. This is surely not restrictive, and the misalignment may be arbitrary.

The inventors of the invention conduct a study of the relationship among the shape, the response characteristics, and the transmittance of the comb-like electrode sections 107a of the pixel electrode 107 formed with the protruding portions 107b as shown in FIG. 15. To be specific, the response time and transmittance are subjected to a comparison by varying the values of the electrode width W, the space L, the height a, the width b, the interval p, and a misalignment $\delta p$. The electrode width W is of the come-like electrode section 107a, and the space L is of between the protruding portions 107b formed to the two sides opposing each other via an aperture section, i.e., slit, formed between any two comb-like electrode sections 107a. The height a is of the concave portion 107b in the y direction, i.e., amplitude of convex portion, the width b is of the convex portion 107b at half of the height of the amplitude of convex portion, i.e., Width of convex portion, and the interval p is of between the protruding portions 107b formed to one side of the comb-like electrode section 107a, i.e., pitch of concave portion. The misalignment $\delta p$ is of between the two protruding portions 107b of the comb-like electrode section 107a when viewed from the x direction. Table 3 shows an exemplary result of the comparison.

TABLE 3

PIXEL ELECTRODE SHAPED AS SHOWN IN FIG. 15;
SHAPE-RESPONSE TIME-TRANSMITTANCE RELATIONSHIP

| [00255] PIXEL ELECTRODE SHAPE | [00256] RUBBING ANGLE (°) | [00257] (μm) | [00258] (μm) | [00259] (μm) | [00260] (μm) | [00261] (μm) | [00262] p (μm) | [00263] RESPONSE TIME (ms) | [00264] TRANSMITTANCE [00265] % |
|---|---|---|---|---|---|---|---|---|---|
| [00266] EXAMPLE 1 (FIG. 15) | [00267] | [00268] | [00269] | [00270] | [00271] | [00272] | [00273] .5 | [00274] 2 | [00275] .9 |
|  | [00276] | [00277] | [00278] | [00279] | [00280] 0 | [00281] | [00282] .5 | [00283] 8 | [00284] .6 |
| [00285] PREVIOUS EXAMPLE | [00286] 0 | [00287] | [00288] | [00289] | [00290] | [00291] | [00292] | [00293] 3 | [00294] .6 |

Note that the response time and the transmittance are both examined by a computer simulation. With the model used for the simulation, the common electrode 109 has the coating thickness of 140 nm, the pixel electrode 107 has the coating thickness of 77 nm, the thickness is 700 nm for both the first and second insulator layers 102 and 106 disposed via the common and pixel electrodes 109 and 107, and the orientation film 108 has the film thickness of 100 nm. The liquid crystal material 3 has a dielectric anisotropy $\Delta\epsilon$ of 4.0, a birefringence anisotropy $\Delta n$ of 0.103, a rotation viscosity $\gamma 1$ of 67 (mPa·s), and an NI point of 70.5° C. The liquid crystal layer has the thickness, i.e., cell gap, of 4.0 μm.

Table 3 also shows, for comparison use, the response time and the transmittance in the previous IPS-mode liquid crystal display device including no protruding portion.

As is known from the result of Table 3, even if the two protruding portions 107b opposing each other via a slit are misaligned by the distance δp when viewed from the x direction, similarly to the case with no misalignment, the response time can be reduced, and the performance of moving image display can be improved for the IPS-mode liquid crystal display device.

Figure 16:
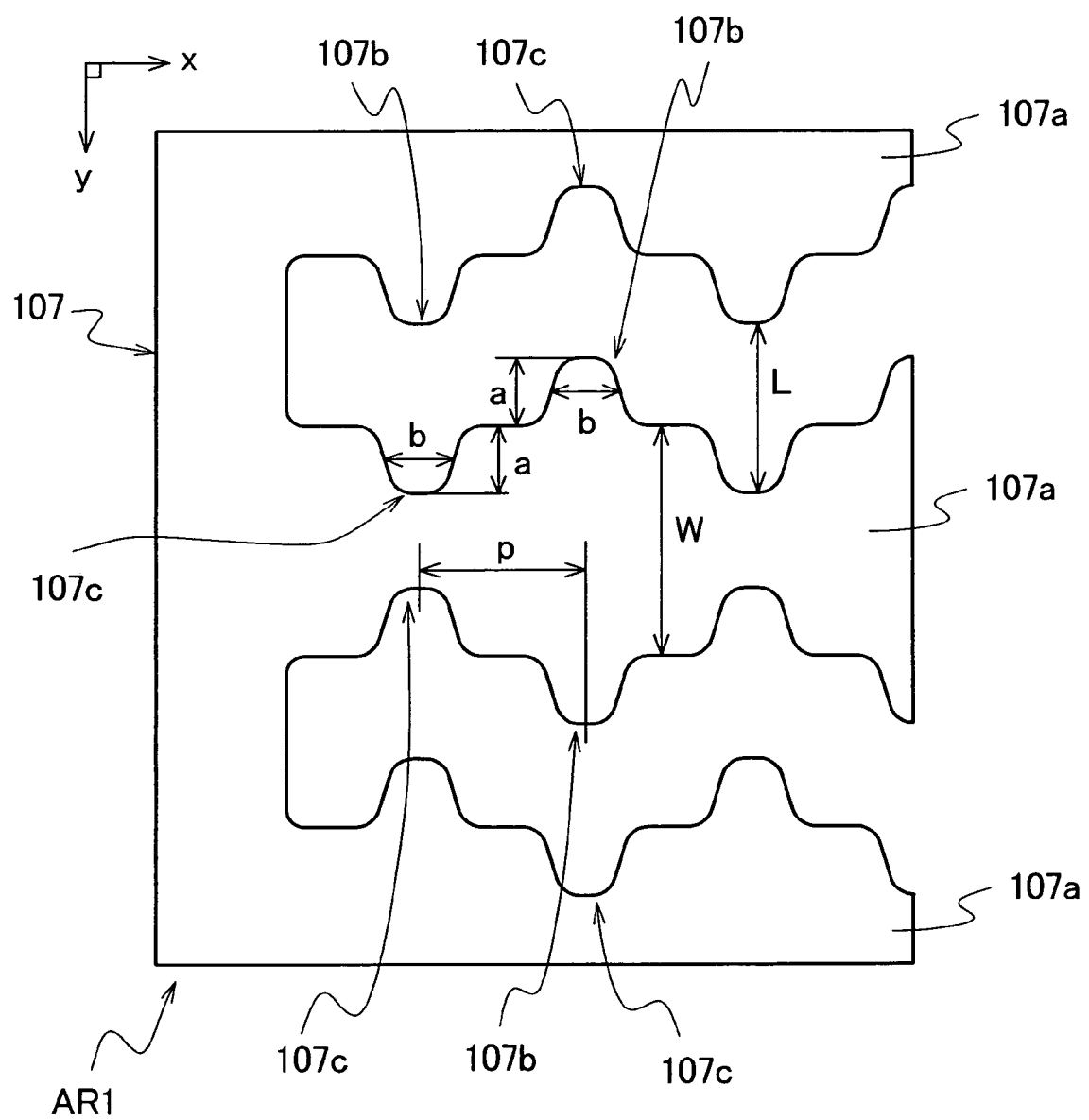
FIG. 16 is a schematic diagram for illustrating a fifth modified example of the liquid crystal display device in the first example.

FIG. 16 is a schematic diagram for illustrating a fifth modified example of the liquid crystal display device in the first example. Note that, similarly to FIG. 7, FIG. 16 is a schematic plan view of the pixel electrode in the area AR1 of FIG. 3, showing only the configuration thereof.

In the liquid crystal display device in the first example, as shown in FIG. 7, for example, only the protruding portions 107b are provided to the two sides along the x direction of the comb-like electrode sections of the pixel electrode. In the first modified example of FIG. 12, for example, only the concave portions 107c are provided to the two sides along the x direction of the comb-like electrode sections 107a. In the liquid crystal display device in the first example, however, the pixel electrode is not restrictive to such shapes, i.e., formed with only the protruding portions 107b or only the concave portions 107c. Alternatively, as shown in FIG. 16, for example, the protruding portion 107b and the concave portion 107c may be alternately provided to each of the two sides of the comb-like electrode section 107a. If this is the case, the protruding portions 107b and the concave portions 107c formed to the two sides of the comb-like electrode section 107a are to be respectively aligned when viewed from the x direction. Still alternatively, the protruding portions 107b and the concave portions 107c formed to the two sides opposing via a slit are to be alternately aligned when viewed from the x direction.

The inventors of the invention conduct a study of the relationship among the shape, the response characteristics, and the transmittance of the comb-like electrode sections 107a of the pixel electrode 107 formed with the protruding portions 107b and the concave portion 107c as shown in FIG. 16. To be specific, the response time and transmittance are subjected to a comparison by varying the values of the electrode width W, the space L, the height a, the width b, and the interval p. The electrode width W is of the come-like electrode section 107a, and the space L is of between the protruding portion 107b and the concave portion 107c formed to the two sides opposing each other via an aperture section, i.e., slit, formed between any two comb-like electrode sections 107a. The height a is of the protruding portion 107b and of the concave portion 107c in the y direction, i.e., amplitude of convex portion and of concave portion, the width b is of the protruding portion 107b and of the concave portion 107c at half of the height of the amplitude of convex portion, i.e., width of convex portion and of concave portion, and the interval (pitch) p is of between the protruding portion 107b and the concave portion 107c formed to one side of the comb-like electrode section 107b. Table 4 shows an exemplary result of the comparison.

TABLE 4

PIXEL ELECTRODE SHAPED AS SHOWN IN FIG. 16;
SHAPE-RESPONSE TIME-TRANSMITTANCE RELATIONSHIP

| [00303] PIXEL ELECTRODE SHAPE | [00304] RUBBING ANGLE (°) | [00305] (μm) | [00306] (μm) | [00307] (μm) | [00308] (μm) | [00309] (μm) | [00310] p (μm) | [00311] RESPONSE TIME (ms) | [00312] TRANSMITTANCE [00313] % |
|---|---|---|---|---|---|---|---|---|---|
| [00314] EXAMPLE 1 (FIG. 16) | [00315] | [00316] | [00317] | [00318] | [00319] 0 | [00320] | [00321] | [00322] 3 | [00323] .8 |
|  | [00324] | [00325] | [00326] | [00327] | [00328] 5 | [00329] | [00330] | [00331] 7 | [00332] .5 |
| [00333] PREVIOUS EXAMPLE | [00334] 0 | [00335] | [00336] | [00337] | [00338] | [00339] | [00340] | [00341] 3 | [00342] .6 |

Note that the response time and the transmittance are both examined by a computer simulation. With the model used for the simulation, the common electrode 109 has the coating thickness of 140 nm, the pixel electrode 107 has the coating thickness of 77 nm, the thickness is 700 nm for both the first and second insulator layers 102 and 106 disposed via the common and pixel electrodes 109 and 107, and the orientation film 108 has the film thickness of 100 nm. The liquid crystal material 3 has a dielectric anisotropy $\Delta\in$ of 4.0, a birefringence anisotropy $\Delta n$ of 0.103, a rotation viscosity $\gamma 1$ of 67 (mPa·s), and an NI point of 70.5° C. The liquid crystal layer has the thickness, i.e., cell gap, of 4.0 µm.

Table 4 also shows, for comparison use, the response time and the transmittance in the previous IPS-mode liquid crystal display device including no protruding portion.

As is known from the result of Table 4, similarly to the case only with the protruding portions 107b or with the concave portions 107c, alternately including the protruding portions 107b and the concave portions 107c can also reduce the response time, and improve the performance of moving image display for the IPS-mode liquid crystal display device.

Figure 17:
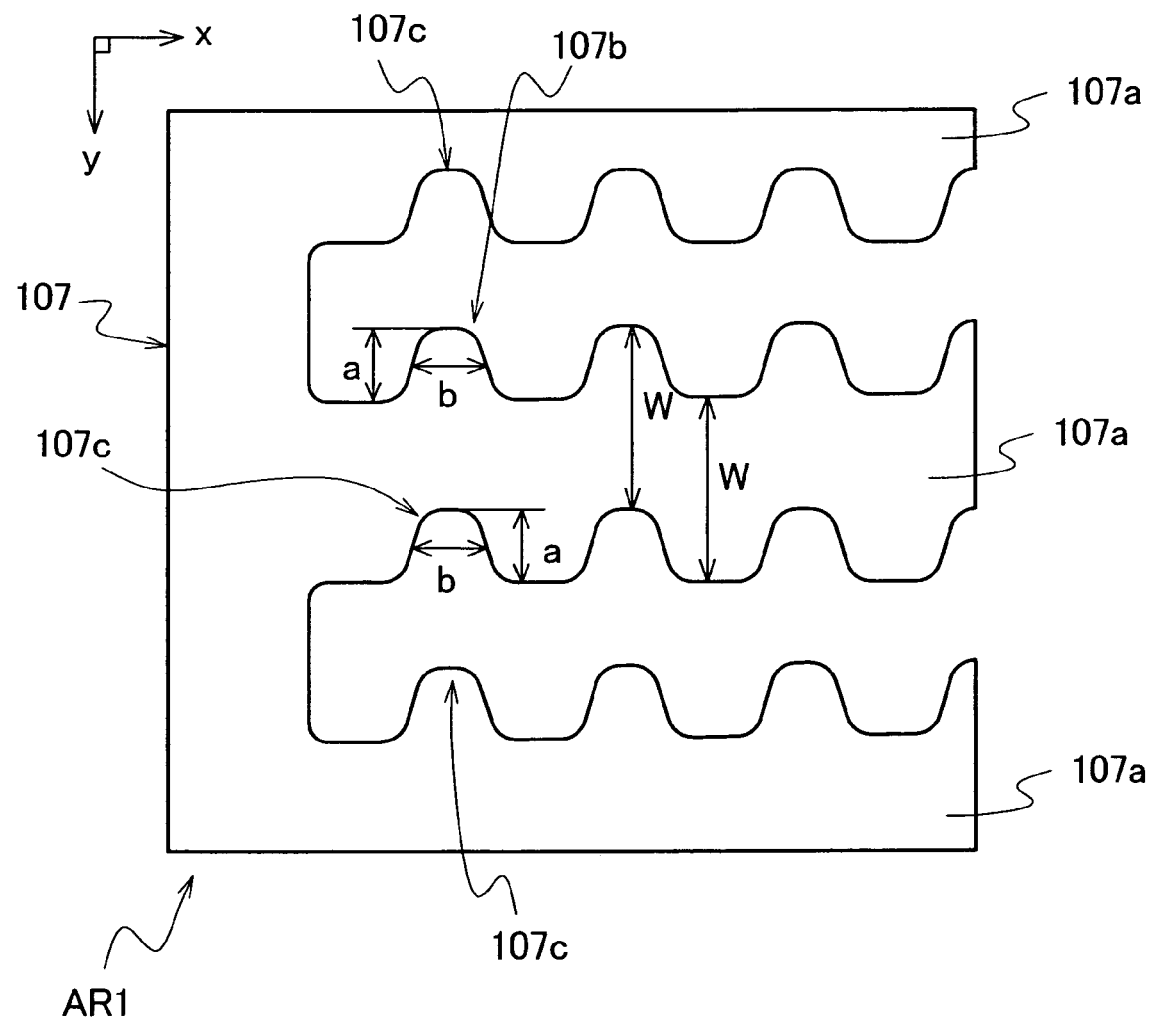
FIG. 17 is a schematic diagram for illustrating a sixth modified example of the liquid crystal display device in the first example.

FIG. 17 is a schematic diagram for illustrating a sixth modified example of the liquid crystal display device in the first example. Note that, similarly to FIG. 7, FIG. 17 is a schematic plan view of the pixel electrode in the area AR1 of FIG. 3, showing only the configuration thereof.

In the description so far, with the liquid crystal display device in the first example, the comb-like electrode section 107a of the pixel electrode 107 is changed in width in the y direction for a plurality of times. This width change is made by providing the protruding portions 107b or the concave portions 107c to the two sides, in the x direction, of the comb-like electrode section 107a of the pixel electrode 107. The shape of the comb-like electrode sections 107b is not restrictive thereto, i.e., width change. Alternatively; the comb-like electrode sections 107a may be misaligned for a plurality of times at intervals shorter than the side in the x direction when viewed from the y direction. For such a shape, as shown in FIG. 17, possibly considered is the shape that one of the two sides of the comb-like electrode section 107a may be provided with the protruding portions 107b, and the other side may be provided with the concave portions 107c. In the resulting comb-like electrode section 107a, the protruding portions 107b and the concave portions 107c are to be aligned when viewed from the x direction. With such a shape, assuming that the electrode width of the comb-like electrode section 107a is W, the width at the position where the protruding portions 107b and the concave portions 107c are provided will be also W when viewed from the y direction.

When the comb-like electrode is so shaped as shown in FIG. 17, the splay and bend deformations are also induced to the orientation of liquid crystal molecules in the vicinity of the protruding portions 107b and the concave portions 107c. Accordingly, compared with the previous IPS-mode liquid crystal display device, the response time can be reduced, and the performance of moving image display can be improved.

Although no detailed description will be given, in the liquid crystal display device in the first example, the comb-like electrode section 107a is surely shaped variously based on the shapes shown in FIGS. 7, and 12 to 17.

Second Example

Figure 18:
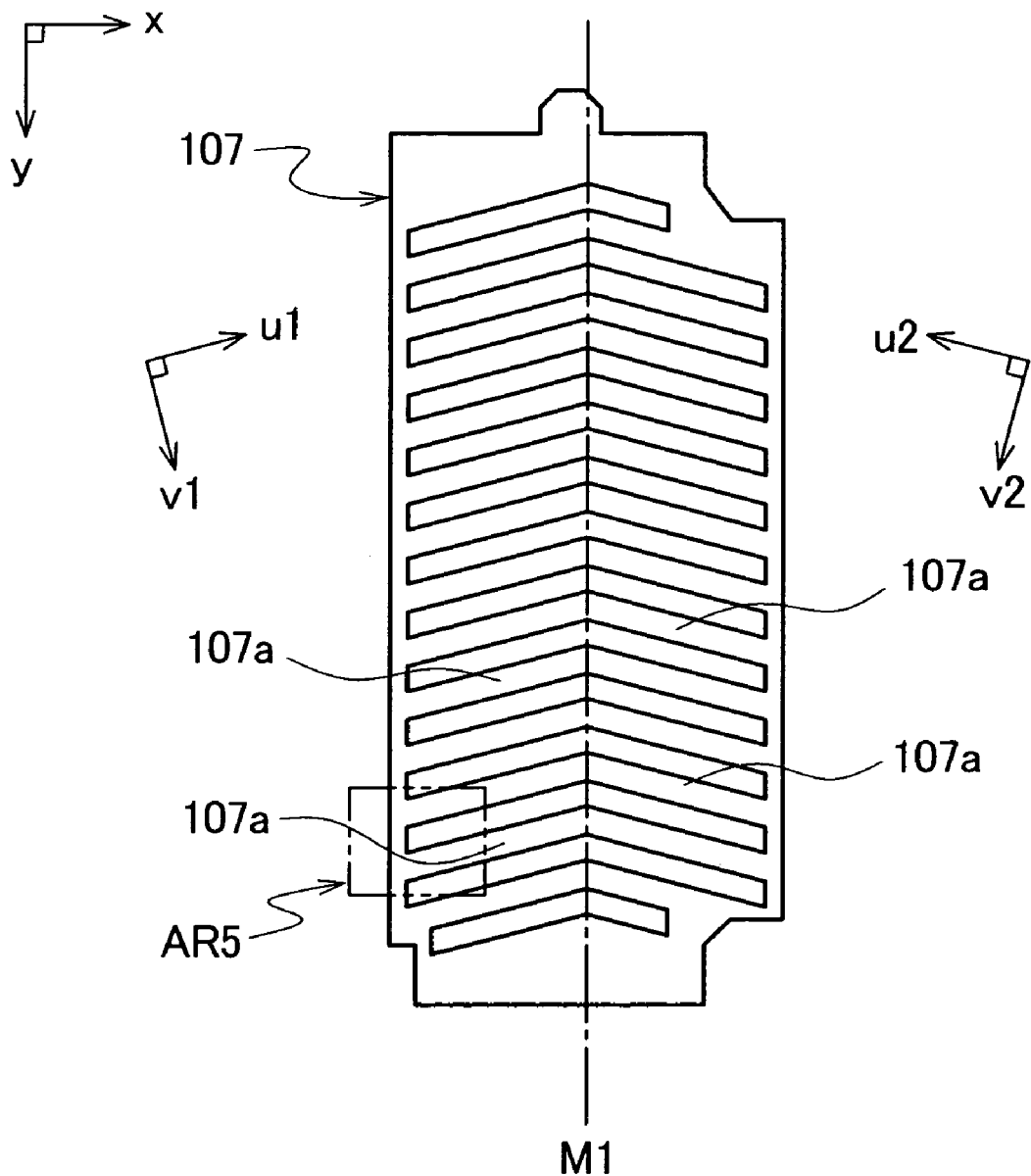
FIG. 18 is a schematic plan view of a pixel electrode of a liquid crystal display device in a second example, showing the overall configuration thereof.
Figure 19:
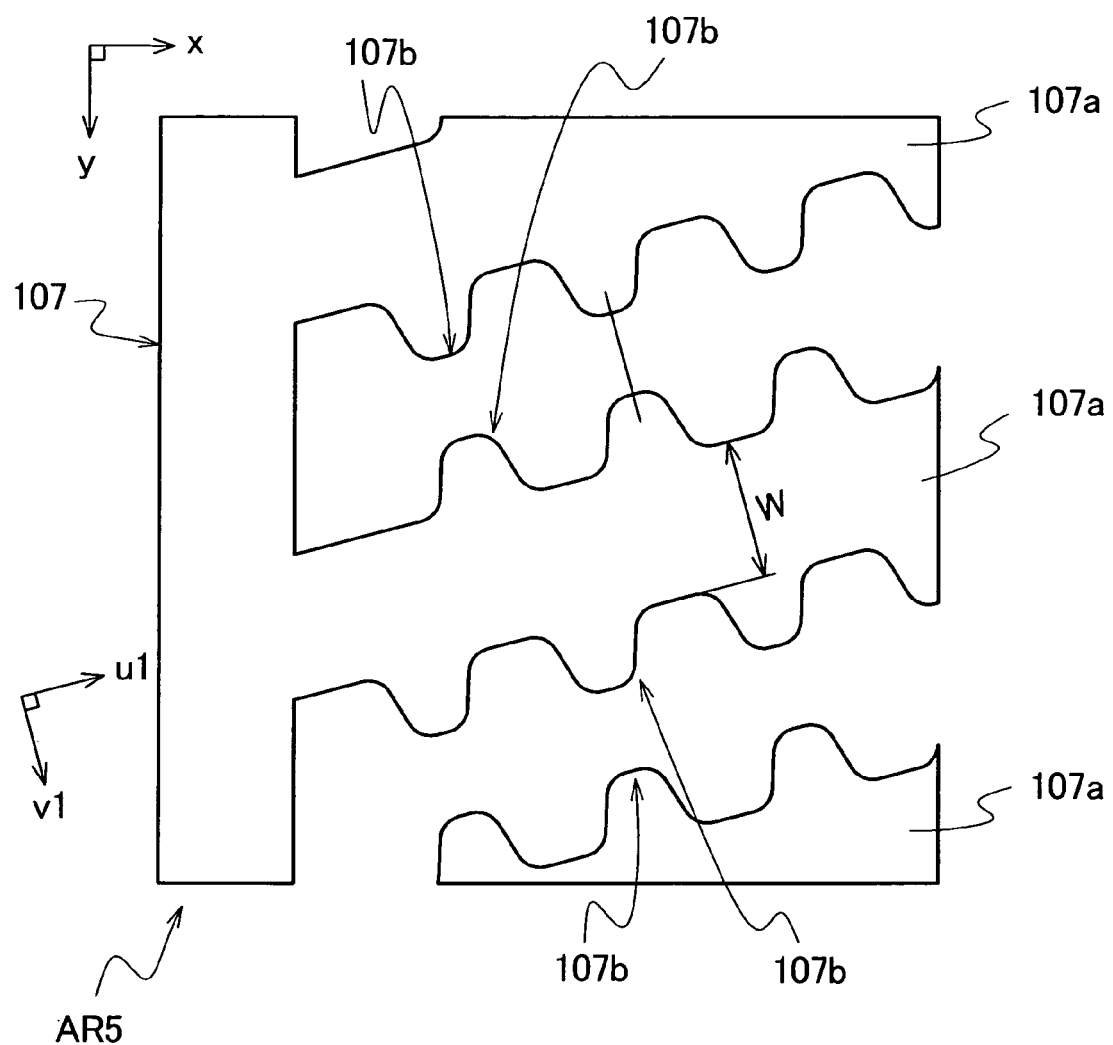
FIG. 19 is a schematic plan view of a pixel electrode in an area AR2 of FIG. 18, showing an exemplary configuration thereof.

FIGS. 18 and 19 are each a schematic plan view of a pixel electrode of a liquid crystal display device in a second example, showing the overall configuration thereof. FIG. 18 is a schematic plan view of the pixel electrode in the liquid crystal display device in the second example, showing the overall configuration thereof. FIG. 19 is a schematic plan view of a pixel electrode in an area AR5 of FIG. 18, showing an exemplary configuration thereof.

In the pixel electrode 107 in the liquid crystal display device of the first example, the comb-like electrode sections 107a are extended in the direction along which the scanning signal lines 101 are extended, i.e., x direction, and are aligned in the direction along which the video signal lines 103 are extended, i.e., y direction. The issue here is that, in the pixel electrode 107 having the comb-like electrode sections 107a, the comb-like electrode sections 107a are not necessarily extended in the x direction, and may be extended diagonally to the x direction. In the second example, described now is an exemplary configuration of the pixel electrode 107 in which the comb-like electrode sections 107a are extended diagonally to the x direction.

Note that, in the liquid crystal display device in the second example, the shape, i.e., configuration, of the pixel electrode 107 is the only difference from the liquid crystal display device in the first example. Therefore, no description is given for the overall configurations of the liquid crystal display device and panel, and the pixel configuration of the TFT substrate 1, and the like.

In the pixel electrode 107, the comb-like electrode sections 107a extended diagonally to the x direction may be shaped substantially like a letter L, and may be aligned in the y direction as shown in FIG. 18, for example. In this case, assuming that the comb-like electrode sections 107a are each divided into two parts by a center line M1 viewed from the x direction. In the resulting left part of the center line M1, the comb-like electrode sections 107a extending in a u1 direction are considered as being aligned in a v1 direction, which is orthogonal to the u1 direction. In the resulting right part of the center line M1, the comb-like electrode sections 107a extending in a u2 direction are considered as being aligned in a v2 direction, which is orthogonal to the u2 direction.

If with the pixel electrode 107 of FIG. 18, in the left part of the center line M1, the protruding portions 107b are provided to the side of each of the comb-like electrode sections 107a along the u1 direction as shown in FIG. 19, for example. When provided to the comb-like electrode sections 107a, the two protruding portions 107b are so aligned, when viewed from the u1 direction, with others opposing thereto via a slit, for example. With this configuration, the u1 and v1 directions of the comb-like electrode sections 107a of FIG. 19 match the x and y direction of the comb-like electrode sections 107a of FIG. 7. Although not shown, for the right area of the center line M1, the comb-like electrode sections 107a shaped as shown in FIG. 19 are flipped horizontally so that the u2 and v2 directions of the comb-like electrode sections 107a match the x and y direction of the comb-like electrode sections 107a of FIG. 7. As such, also in the liquid crystal display device in the second example, compared with the previous IPS-mode liquid crystal display device, the response time can be reduced, and the performance of moving image display can be improved.

Although not shown or described in detail, also in the liquid crystal display device in the second example, the comb-like electrode sections 107a may be provided with the concave portions 107c as alternative to the protruding portions 107b.

Figure 20:
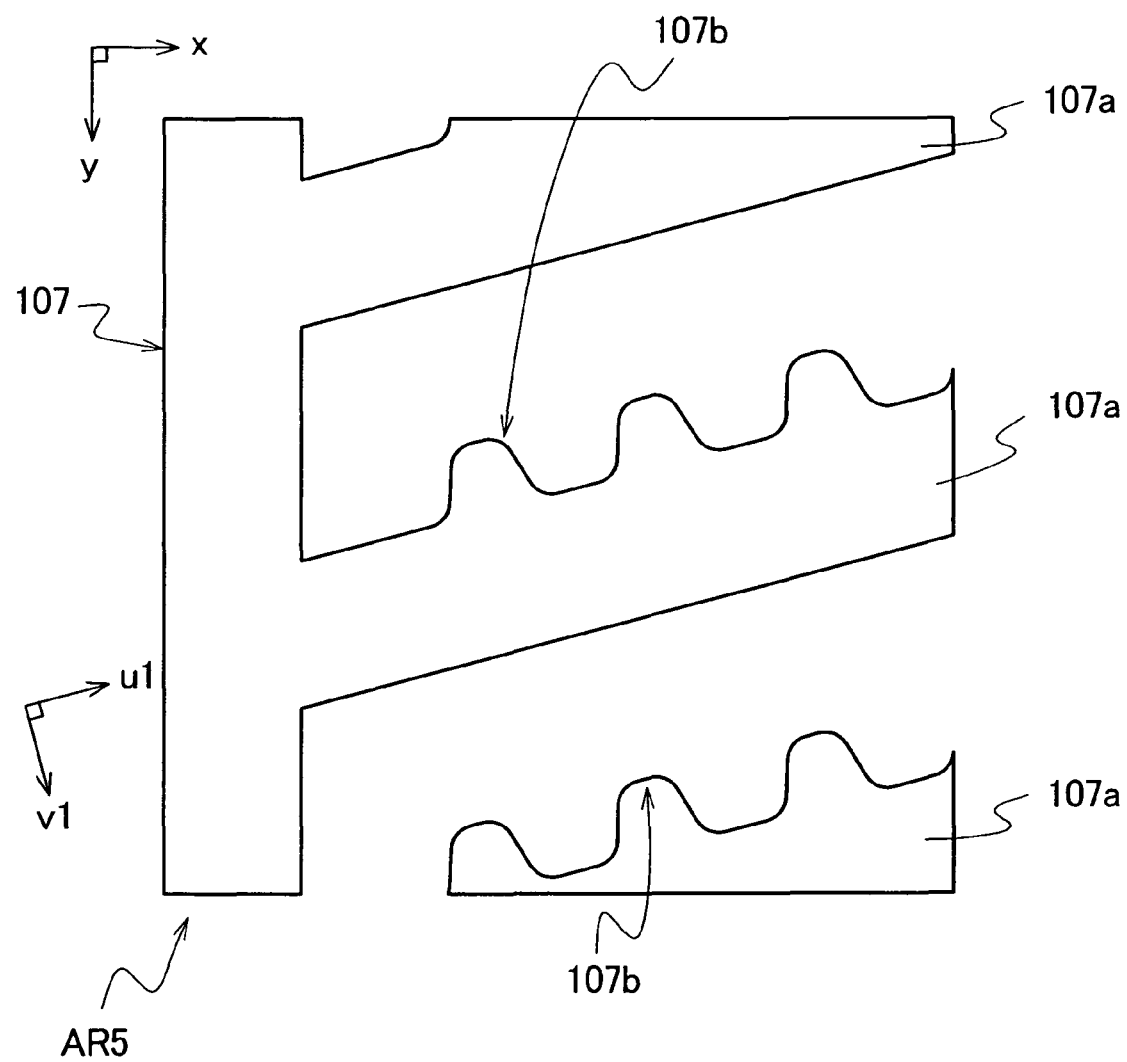
FIG. 20 is a schematic diagram for illustrating a first modified example of the liquid crystal display device in the second example.
Figure 21:
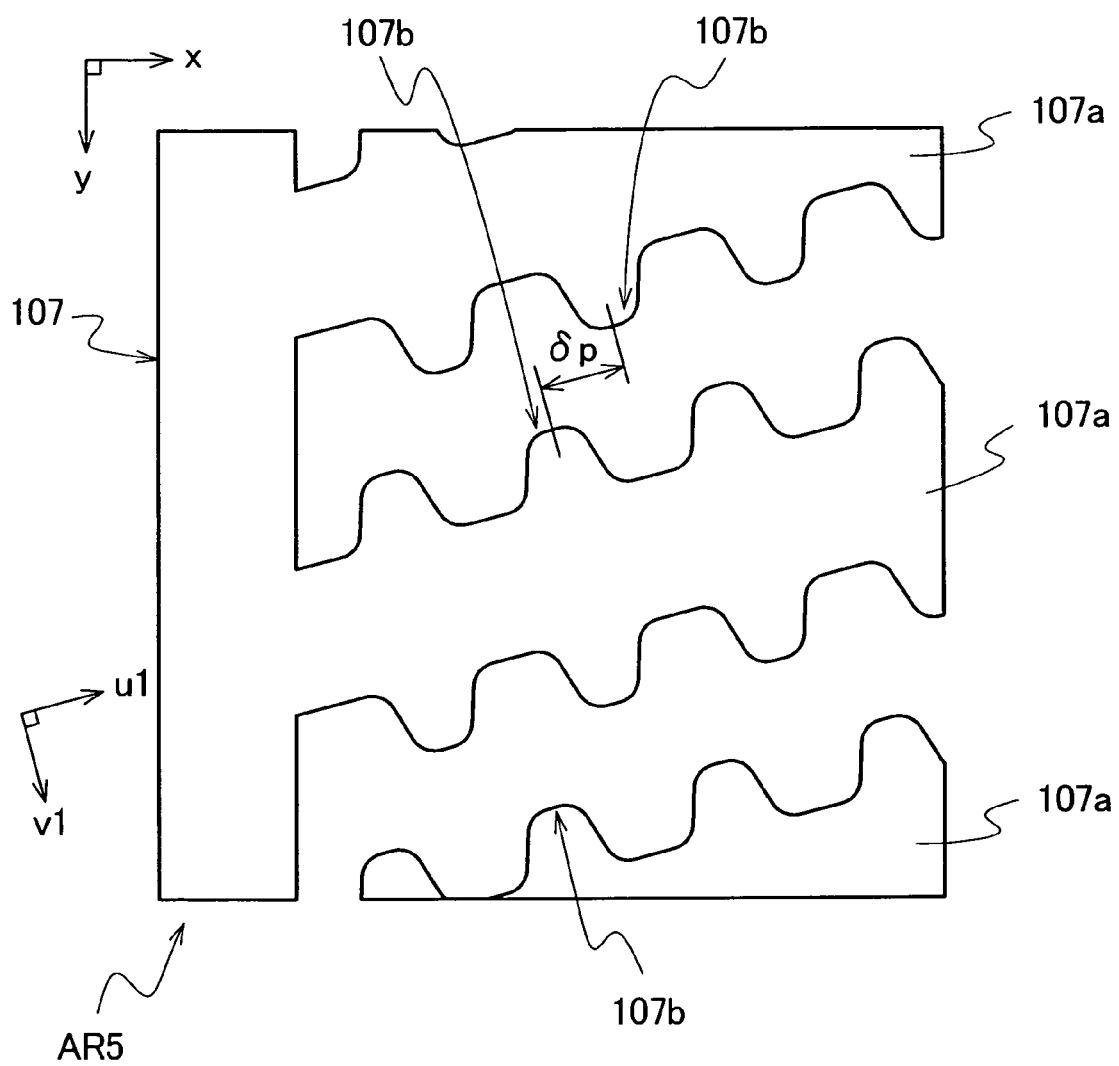
FIG. 21 is a schematic diagram for illustrating a second modified example of the liquid crystal display device in the second example.

FIG. 20 is a schematic diagram for illustrating a first modified example of the liquid crystal display device in the second example. FIG. 21 is a schematic diagram for illustrating a second modified example of the liquid crystal display device in the second example. Similarly to FIG. 19, FIGS. 20 and 21 are each a schematic plan view of the pixel electrode in the area AR5 of FIG. 18, showing only the configuration thereof.

The pixel electrode 107 in the liquid crystal display device in the second example is, essentially, shaped equivalently to the pixel electrode 107 in the liquid crystal display device in the first example, and an only difference therebetween is which direction the comb-like electrode sections 107a are directed. Accordingly, also in the pixel electrode in the second example, the protruding portions 107b are surely provided only to one of the two sides of the comb-like electrode sections 107a along the u1 direction as shown in FIG. 20, for example. Although not shown, surely, the concave portions 107c are surely provided only to one of the two sides of the comb-like electrode sections 107a along the u1 direction.

If the protruding portions 107b are provided to both of the two sides of the comb-like electrode section 107a along the u1 direction, the protruding portions 107b on the two sides opposing each other via a slit are surely misaligned by the interval Sp as shown in FIG. 21, for example.

Although not shown or described in detail, also in the liquid crystal display device in the second example, the two sides of the comb-like electrode sections 107a along the u1 direction may be shaped as shown in FIGS. 12 to 17, or shaped differently based on such shapes.

Figure 22:
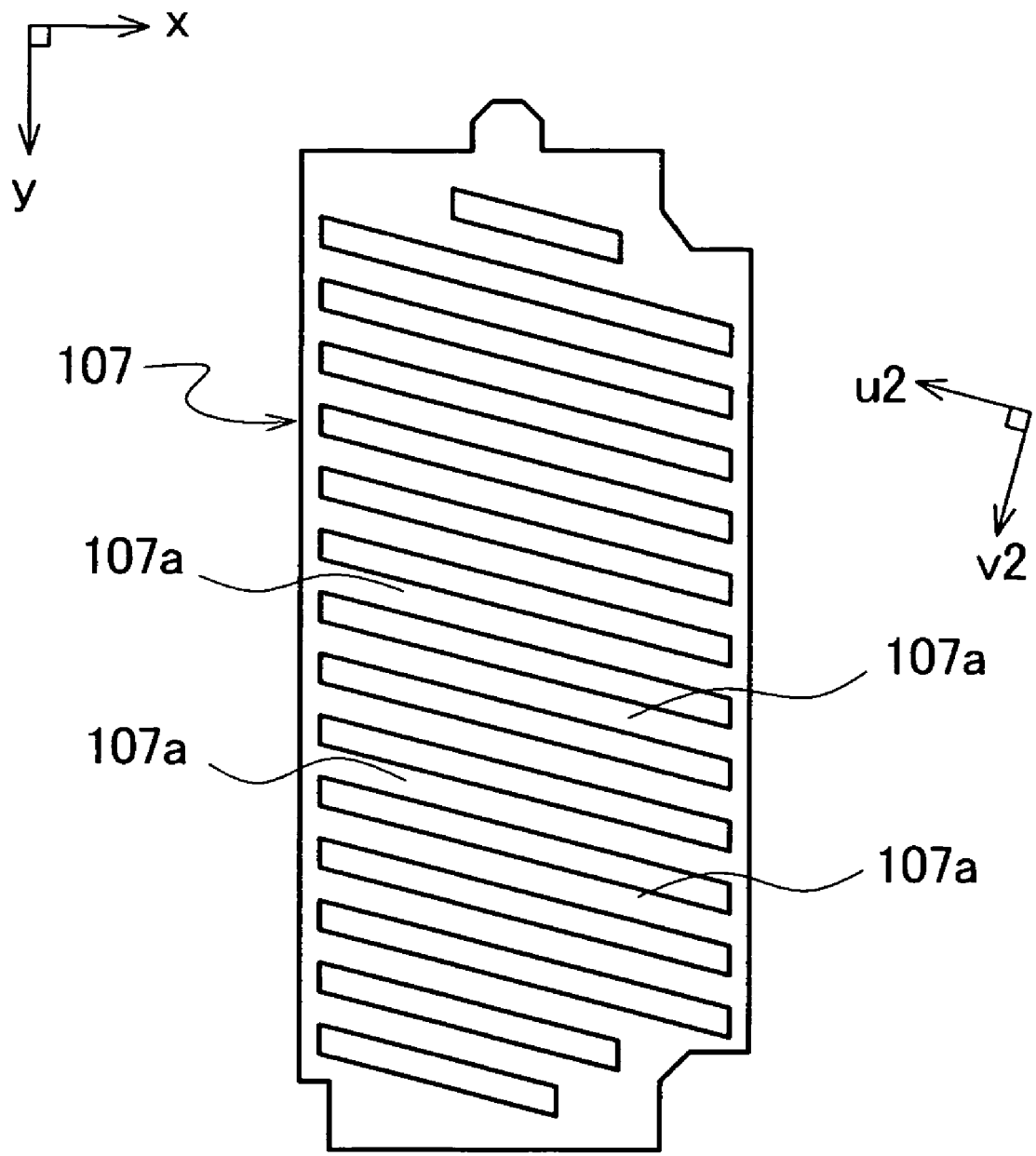
FIG. 22 is a schematic diagram for illustrating a first application example of the shape of the pixel electrode in the second example.
Figure 23:
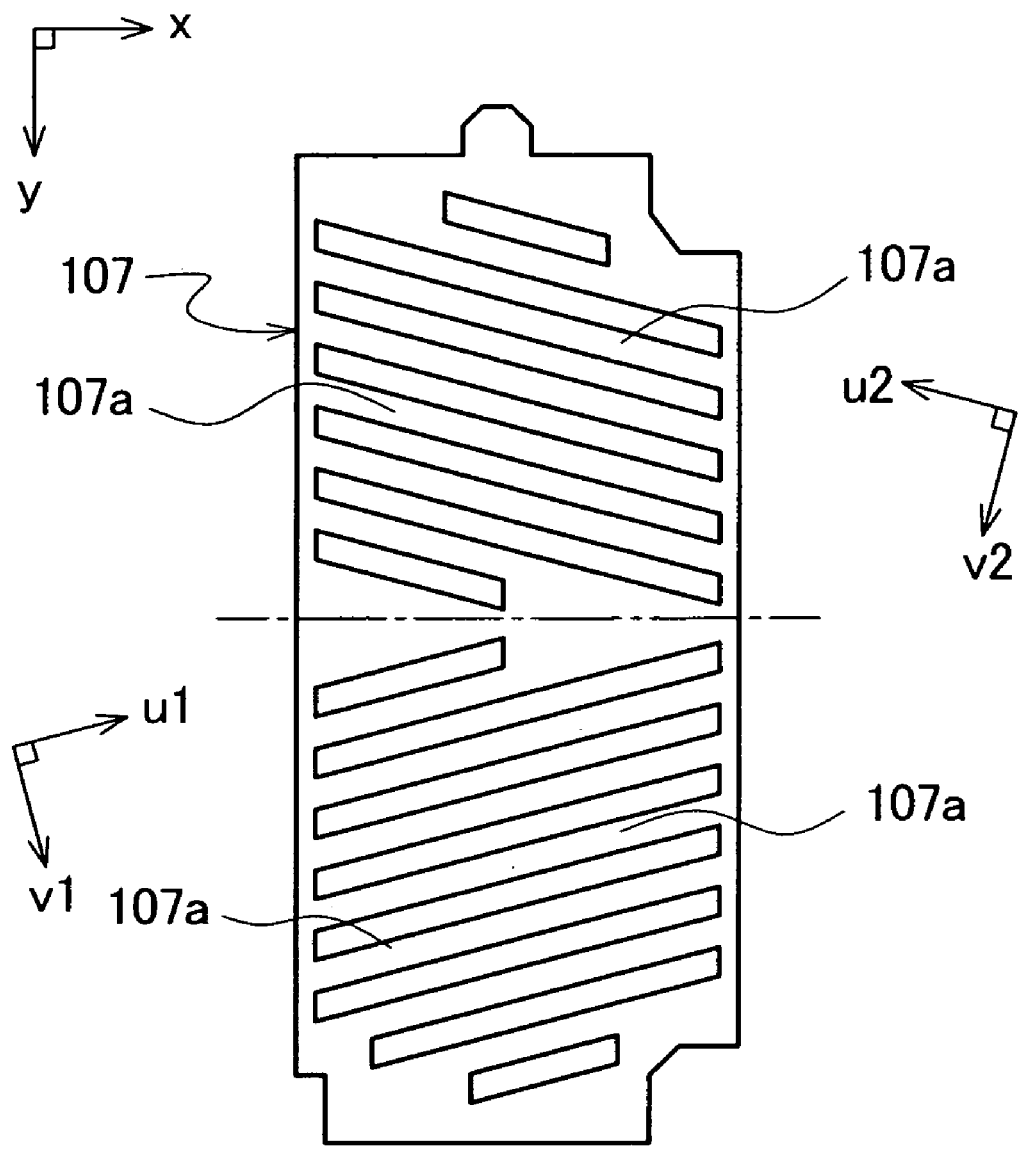
FIG. 23 is a schematic diagram for illustrating a second application example of the shape of the pixel electrode in the second example.

FIG. 22 is a schematic diagram for illustrating a first application example of the shape of the pixel electrode in the second example. FIG. 23 is a schematic diagram for illustrating a second application example of the shape of the pixel electrode in the second example.

In the pixel electrode 107 in the liquid crystal display device in the second example, characteristically, the comb-like electrode sections 107a are extended in the direction different from the scanning signal lines 101, i.e., x direction. The pixel electrode 107 in which the comb-like electrode sections 107a are extended diagonally to the direction along which the scanning signal lines 101 are extended, i.e., x direction, is not restrictive to the shape of FIG. 18, and various other shapes are so far proposed.

In the pixel electrode 107, the comb-like electrodes 107a extended diagonally to the direction along which the scanning signal lines 101 are extended, i.e., x direction, may be simply extended, as shown in FIG. 22, in the u2 direction, for example. Also in this case, the direction along which the comb-like electrode sections 107a are extended, i.e., u2 direction, is regarded as the direction along which the comb-like electrode sections 107a are extended in the first example 1, i.e., x direction. Similarly, the v2 direction orthogonal to the u2 direction is regarded as the direction along which the comb-like electrode sections 107a are extended in the first example 1, i.e., y direction, and the comb-like electrode sections 107a are provided with the protruding portions 107b or the concave portions 107c. This favorably reduces the response time, and improves the performance of moving image display compared with the previous IPS-mode liquid crystal display device.

In the pixel electrode 107, the comb-like electrodes 107a simply extended diagonally to the direction along which the scanning signal lines 101 are extended, i.e., x direction, may be divided into two parts by a center line M2 viewed from the y direction as shown in FIG. 23, for example. In this case, in the upper part of the center line M2, the comb-like electrode sections 107a are extended in the u2 direction, and in the lower part of the center line M2, the comb-like electrode sections 107a are extended in the u1 direction. Also in this case, for the upper and lower parts of the center line M2, the protruding portions 107b or the concave portions 107c are provided to the side along which the comb-like electrode sections 107a are extended, i.e., u2 or u1 direction. As such, also in the liquid crystal display device in the second example, compared with the previous IPS-mode liquid crystal display device, the response time can be reduced, and the performance of moving image display can be improved.

Figure 24:
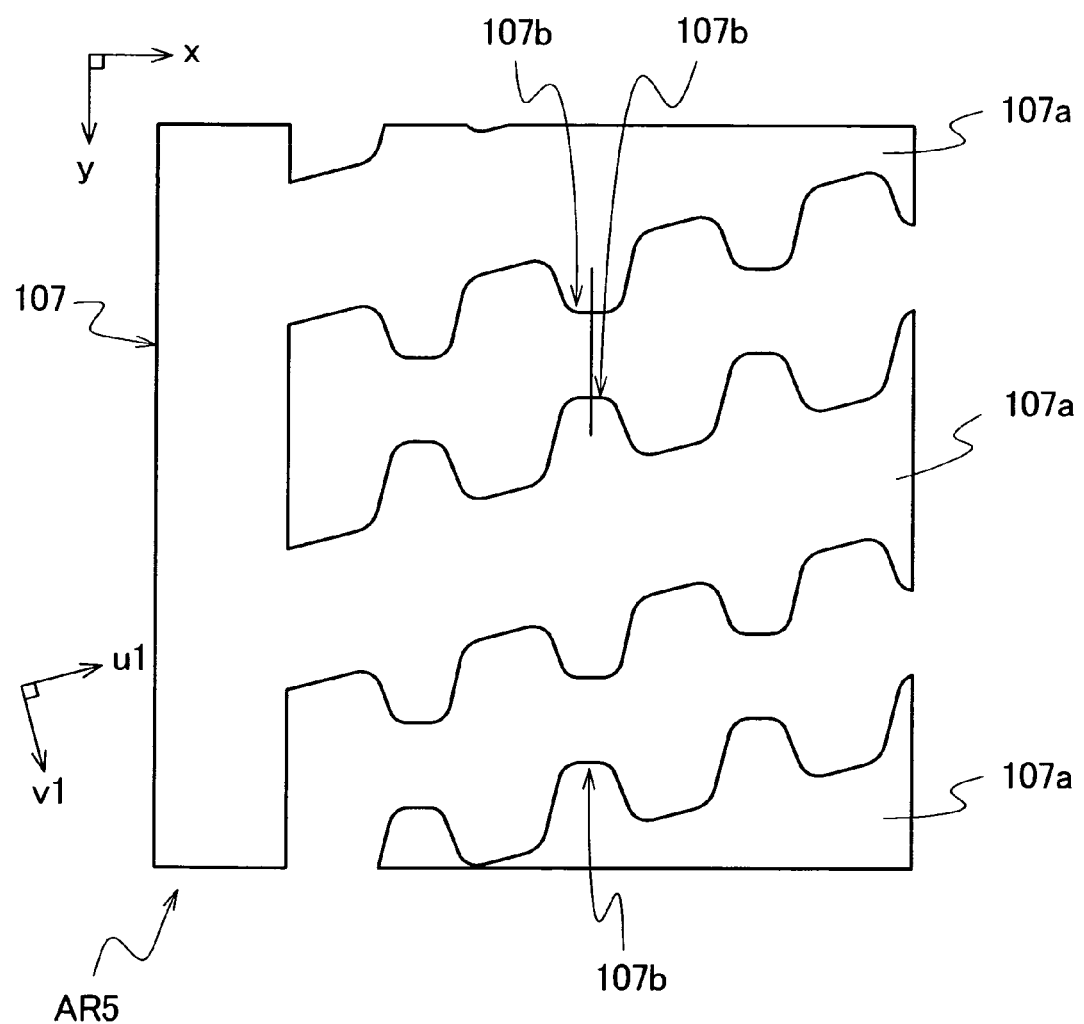
FIG. 24 is a schematic diagram for illustrating a third modified example of the liquid crystal display device in the second example.

FIG. 24 is a schematic diagram for illustrating a third modified example of the pixel electrode in the second example. Similarly to FIG. 19, FIG. 24 is a schematic plan view of the pixel electrode in the area AR5 of FIG. 18, showing only the configuration thereof.

In the liquid crystal display device in the second example, exemplified is the pixel electrode 107 in which the comb-like electrode sections 107a are extended along the u1 or u2 direction, i.e., diagonally to the direction along which the scanning signal lines 101 are extended, i.e., x direction. In this case, the protruding portions 107b provided to the comb-like electrode sections 107a are protruded in the v1 direction orthogonal to the extension direction, i.e., u1 direction, as shown in FIG. 19, for example. The protruding portions 107b are also provided to be aligned when viewed from the u1 direction.

The liquid crystal display device in the second example is not restrictive to the above-described configurations. As shown in FIG. 24, for example, the comb-like electrode sections 107a extended in the u1 direction may be provided with the protruding portions 107b extended in the y direction, and aligned when viewed from the x direction.

While the invention has been described in detail, the foregoing description is in all aspects illustrative and not restrictive. It is understood that numerous other modifications and variations can be devised without departing from the scope of the invention.

What is claimed is:

1. A liquid crystal display device, comprising:
a liquid crystal display panel configured by a pair of substrates sandwiching therebetween a liquid crystal material; and
a pixel electrode disposed on one of the pair of substrates, wherein
the pixel electrode includes a plurality of comb-like electrode sections which extend in a first direction and are aligned in a second direction which is different from the first direction,
the comb-like electrode sections of the pixel electrode are varied in width in the second direction,
each of the comb-like electrode sections has two sides extending in the first direction,
each of the comb-like electrode sections has a plurality of protruding portions or a plurality of recessed portions in at least one of the sides, and
in two of the adjacent comb-like electrode sections, the protruding portions or the recessed portions in the sides opposing each other via a slit formed between the two of the adjacent comb-like electrode sections are slightly misaligned in a position of the first direction by an amount smaller than an interval between the protruding portions or the recessed portions in one of the sides.

2. The liquid crystal display device according to claim 1, wherein
a flat-shaped common electrode is disposed on the one of the pair of substrates,
the flat-shaped common electrode is disposed to overlay the pixel electrode via an insulator layer when viewed from above.

3. The liquid crystal display device according to claim 1, wherein
   the first direction include a third direction and a fourth direction,
   each of the comb-like electrode sections is bent and has a first region and a second region, wherein,
   the first region extend in the third direction and the second region extend in the third direction.

4. The liquid crystal display device according to claim 1, wherein
   the liquid crystal display panel has a plurality of pixels,
   the pixel electrode includes the plurality of comb-like electrode sections and a plurality of second comb-like electrode sections in each of the pixels, wherein
   the plurality of second comb-like electrode sections extend in a third direction which is different from the first direction, and are aligned in the second direction.

5. A liquid crystal display device, comprising:
   a liquid crystal display panel configured by a pair of substrates sandwiching therebetween a liquid crystal material; and
   a pixel electrode disposed on one of the pair of substrates, wherein
   the pixel electrode includes a plurality of comb-like electrode sections which extend in a first direction and are aligned in a second direction which is different from the first direction,
   the comb-like electrode sections of the pixel electrode are varied in width in the second direction,
   each of the comb-like electrode sections has two sides extending in the first direction,
   each of the comb-like electrode sections has a plurality of protruding portions and a plurality of recessed portions alternately in each of the sides,
   the protruding portions in one of the sides oppose the protruding portions in the other of the sides,
   the recessed portions in one of the sides oppose the recessed portions in the other of the sides, and
   two of the comb-like electrode sections are adjacent and have respective sides opposing each other via an aperture formed between the two adjacent comb-like electrode sections that are disposed such that the protruding portions in the respective opposing side of one of the two adjacent comb-like electrode sections oppose the recessed portions in the respective opposing side of the other of the two adjacent comb-like electrode sections.

6. The liquid crystal display device according to claim 5, wherein
   a flat-shaped common electrode is disposed on the one of the pair of substrates,
   the flat-shaped common electrode is disposed to overlay the pixel electrode via an insulator layer when viewed from above.

7. The liquid crystal display device according to claim 5, wherein
   the first direction include a third direction and a fourth direction,
   each of the comb-like electrode sections is bent and has a first region and a second region, wherein,
   the first region extend in the third direction and the second region extend in the third direction.

8. The liquid crystal display device according to claim 5, wherein
   the liquid crystal display panel has a plurality of pixels,
   the pixel electrode includes the plurality of comb-like electrode sections and a plurality of second comb-like electrode sections in each of the pixels, wherein
   the plurality of second comb-like electrode sections extend in a third direction which is different from the first direction, and are aligned in the second direction.

* * * * *